United States Patent [19]

Yabe

[11] 4,288,809
[45] Sep. 8, 1981

[54] TELEVISION RECEIVER APPARATUS FOR SELECTIVELY DISPLAYING A VIDEO PICTURE OR ALPHANUMERIC DATA INFORMATION

[75] Inventor: Toyoji Yabe, Tokyo, Japan

[73] Assignee: Sony Corporation, Tokyo, Japan

[21] Appl. No.: 152,116

[22] Filed: May 21, 1980

[30] Foreign Application Priority Data

May 23, 1979 [JP] Japan ............................. 54-63527

[51] Int. Cl.³ ............................................. H04N 9/32
[52] U.S. Cl. ....................................... 358/12; 358/22; 358/147; 358/183; 340/748
[58] Field of Search ............... 358/12, 22, 141, 142, 358/146, 147, 183; 340/324 AD, 711, 712, 790

[56] References Cited

U.S. PATENT DOCUMENTS 3,757,037 9/1973 Bialek .......................... 340/324 A
4,074,315 2/1978 Kawamura et al. .............. 358/142
4,135,213 1/1979 Wintfeld et al. ................. 358/142

Primary Examiner—Richard Murray
Attorney, Agent, or Firm—Lewis H. Eslinger; Alvin Sinderbrand

[57] ABSTRACT

Television receiver apparatus is disclosed for receiving and selectively displaying a video picture derived from video signals transmitted on a broadcasting channel, or alphanumeric data information derived from alphanumeric data signals which are transmitted during at least one horizontal line interval in each video frame interval. A predetermined number of alphanumeric data programs are transmitted on a given broadcasting channel, with each alphanumeric data program being comprised of alphanumeric data signals and an alphanumeric data program identification code. An entire alphanumeric data program is transmitted over a number of frame intervals. The television receiver apparatus includes an alphanumeric data program separator for separating the alphanumeric data signals and the alphanumeric data program identification code from the received broadcasting channel. A memory stores all of the alphanumeric data program identification codes transmitted on the received broadcasting channel; and a write-in circuit writes each of the alphanumeric data program identification codes into the memory, and a read-out circuit reads out each of the stored alphanumeric data program identification codes. A display device, such as the display screen of the television cathode ray tube, displays the alphanumeric data program identification codes which are read out of the memory. In accordance with one embodiment of this invention, the particular one of the displayed alphanumeric data program identification codes which then is being received by the television receiver apparatus is indicated. In accordance with another embodiment, any of the displayed alphanumeric data program identification codes may be selected such that the alphanumeric data information contained in that program is displayed, and the selected alphanumeric data program identification code is displayed distinctively.

24 Claims, 46 Drawing Figures

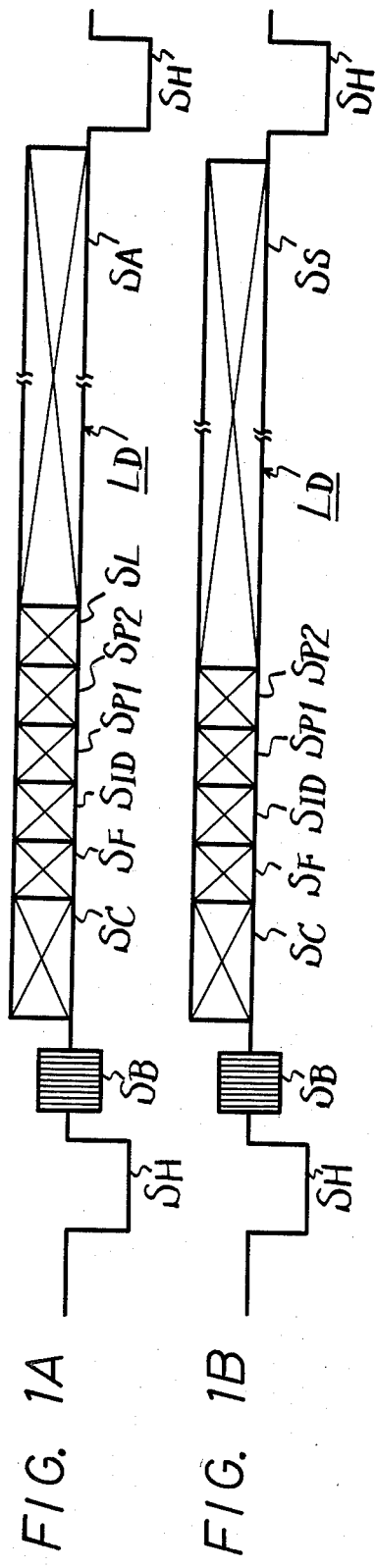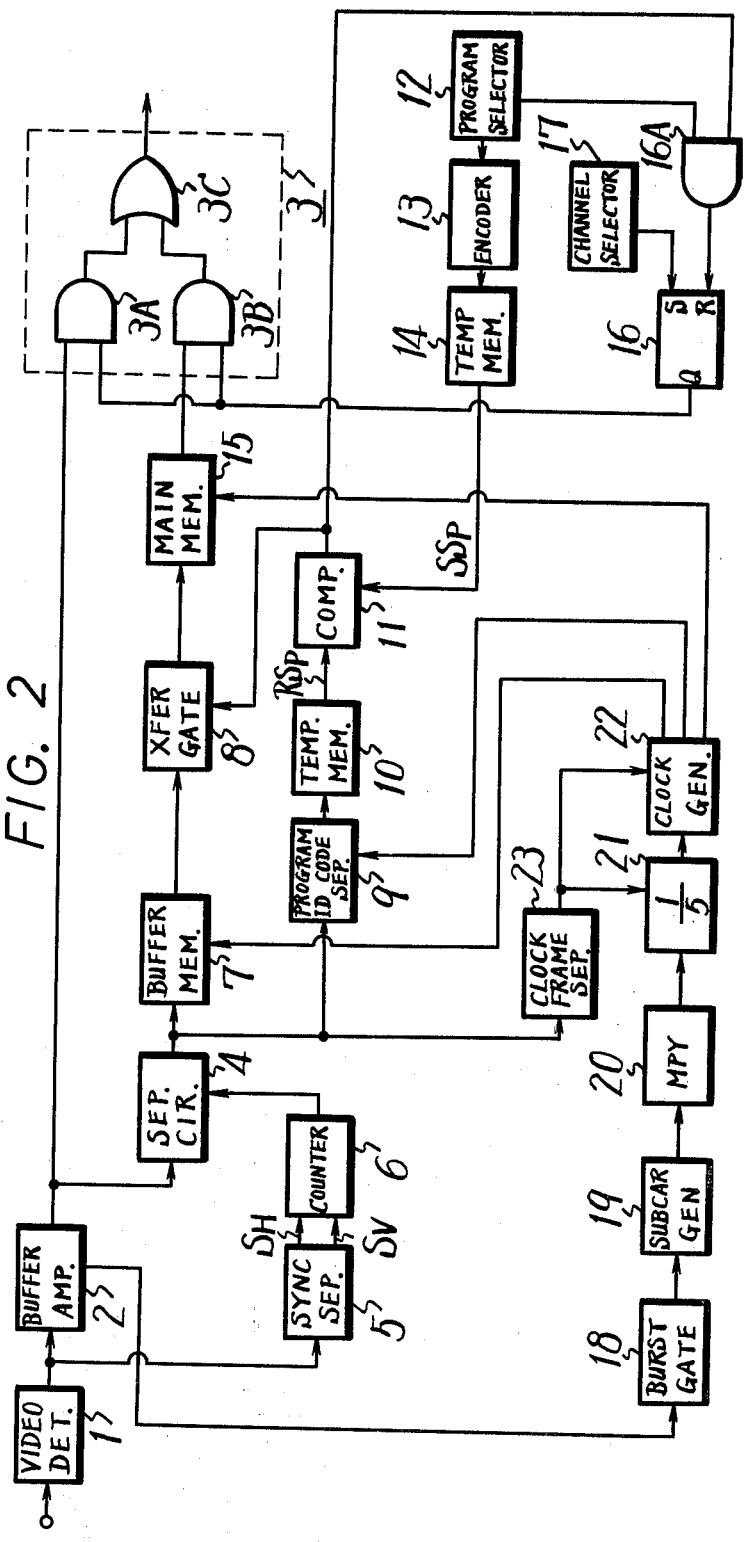

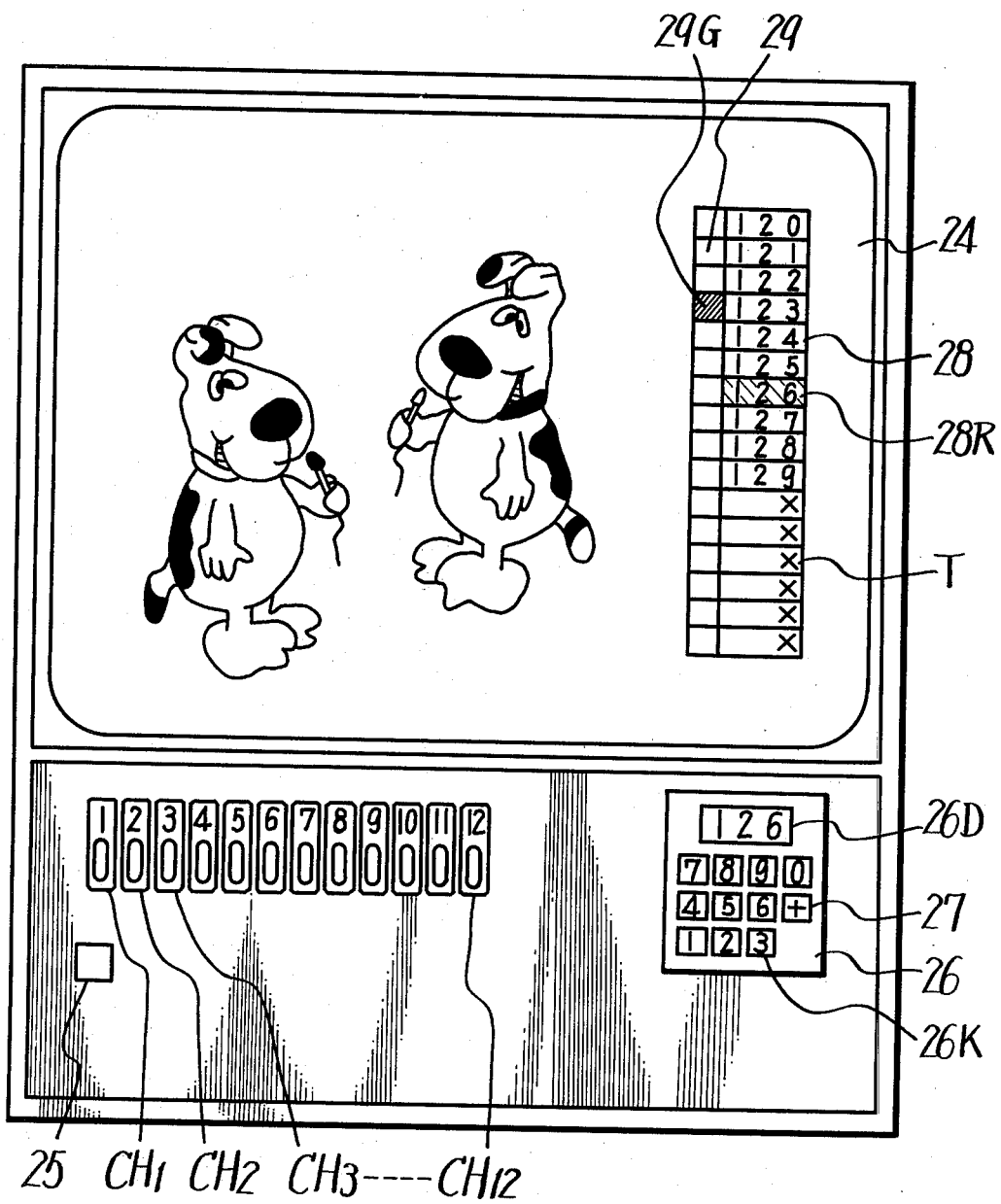

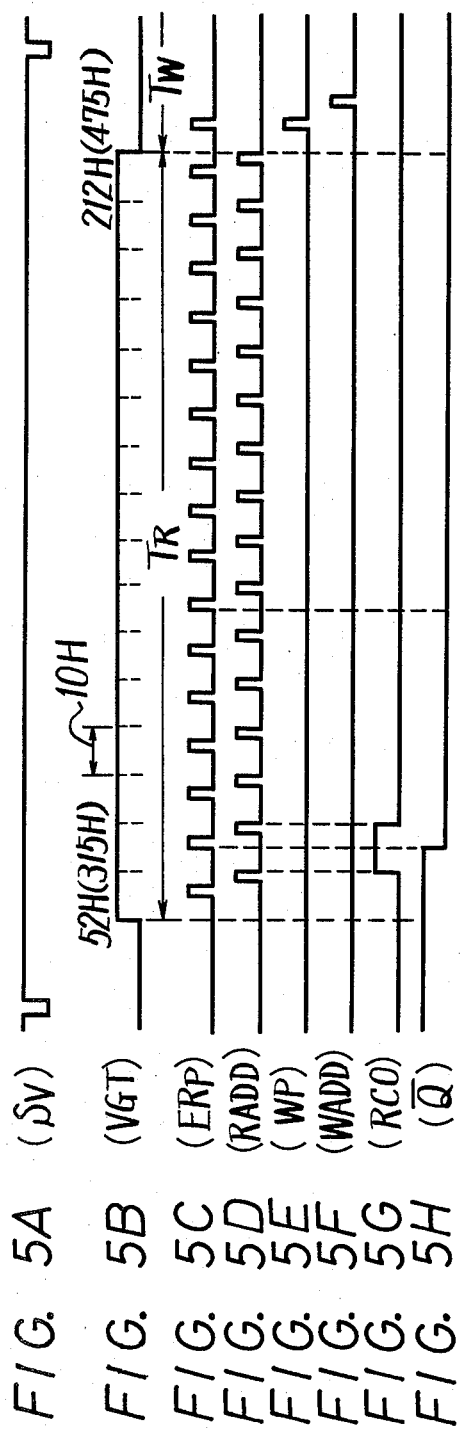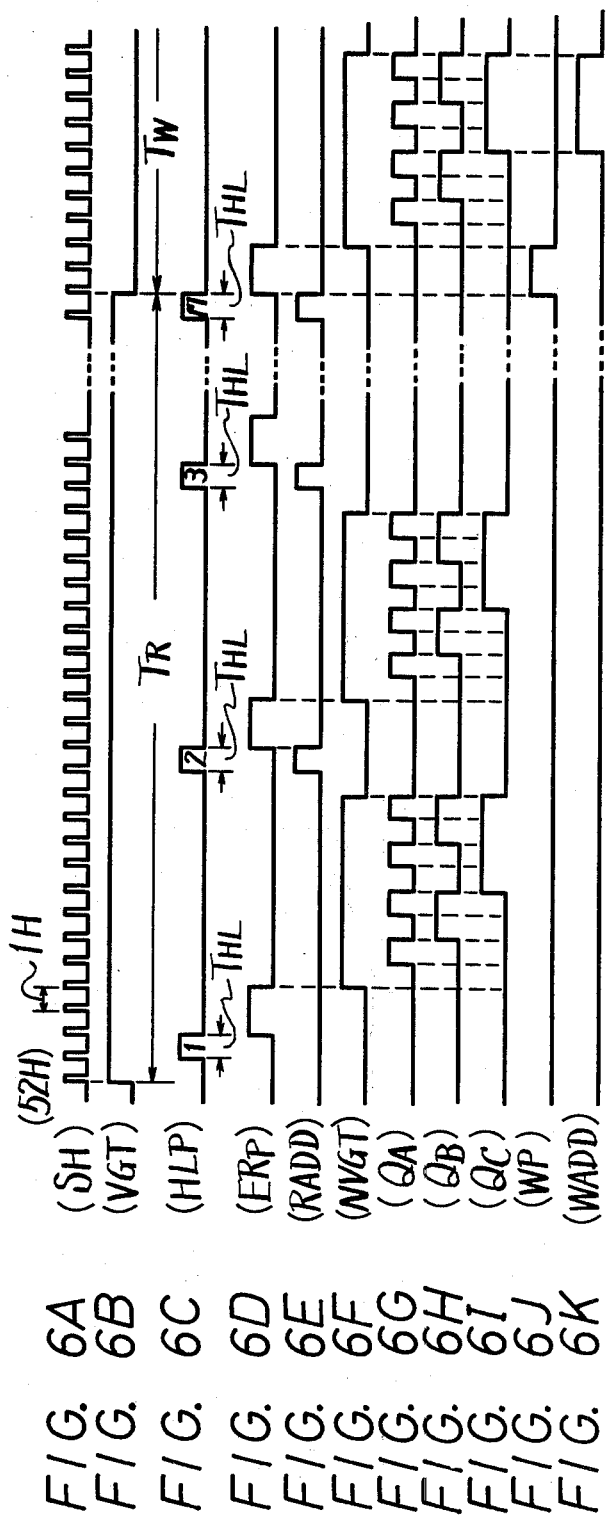

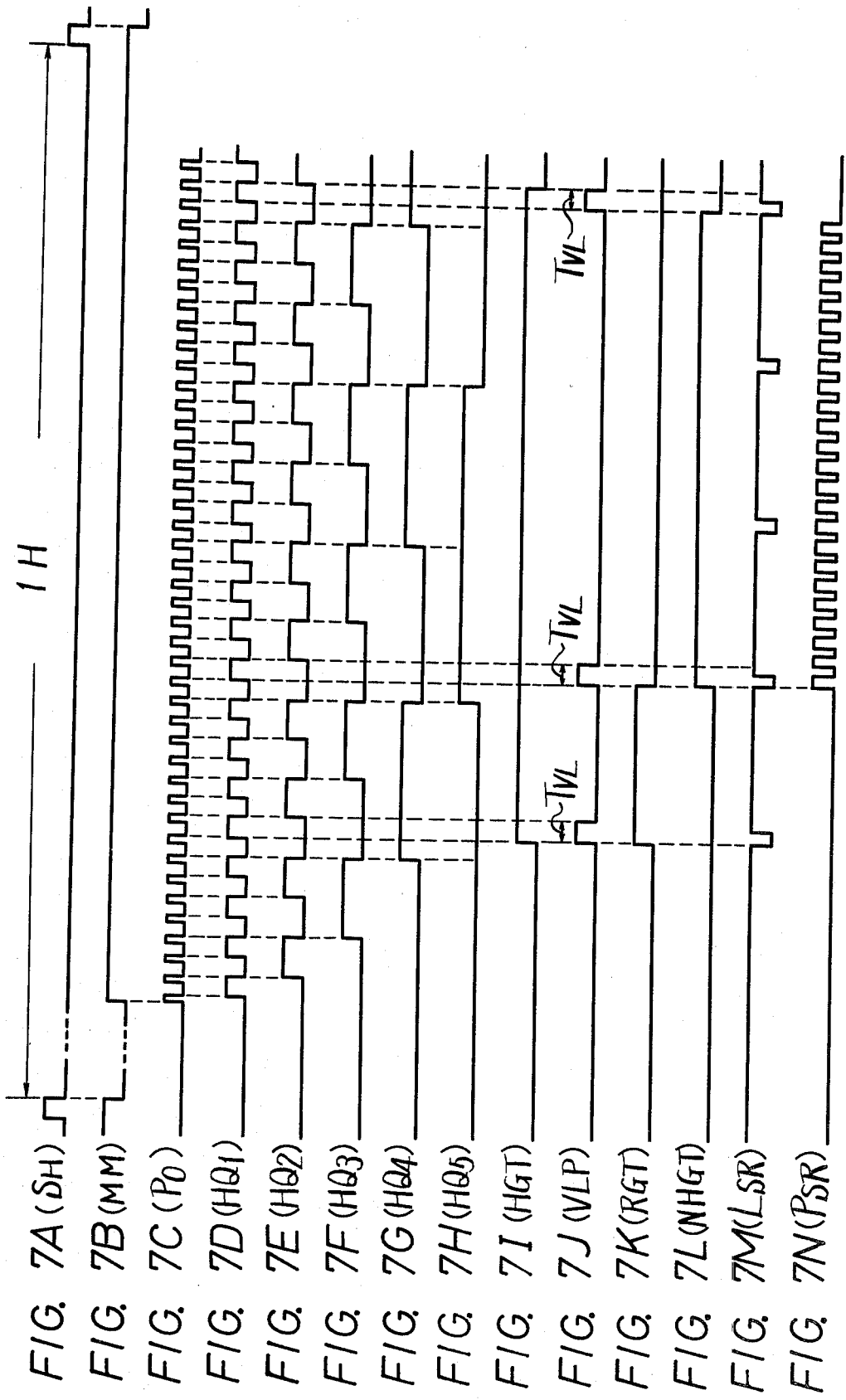

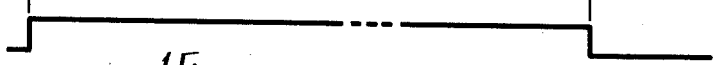
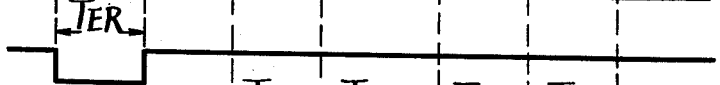
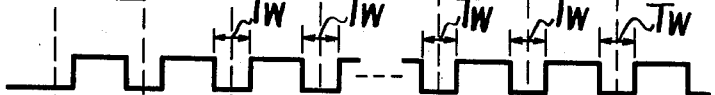
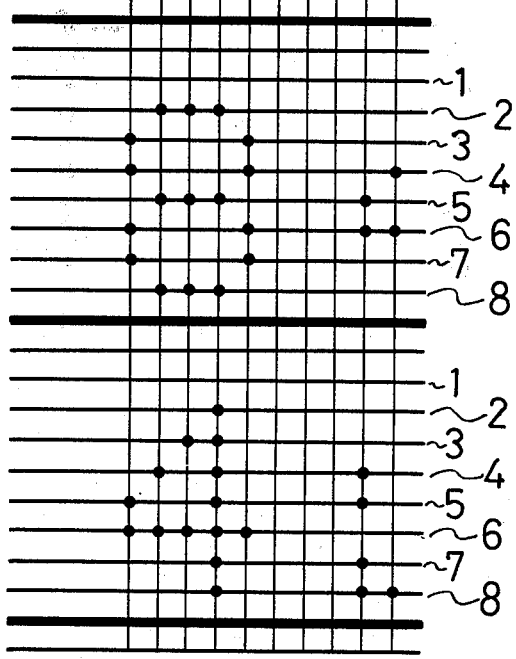

TELEVISION RECEIVER APPARATUS FOR SELECTIVELY DISPLAYING A VIDEO PICTURE OR ALPHANUMERIC DATA INFORMATION

BACKGROUND OF THE INVENTION

This invention relates to television receiver apparatus of the type which is capable of receiving and displaying a video picture derived from transmitted video signals, or alphanumeric data information derived from alphanumeric data program signals which are multiplexed with the video signals; and, more particularly, to such apparatus wherein all of the alphanumeric data programs which are transmitted on a given television broadcast channel are displayed, such as by titles or code, so as to apprise a user of those alphanumeric data programs which are available. This invention also particularly relates to such a display wherein the particular alphanumeric data program which then is being received is indicated, and the particular alphanumeric data program which the user may select also is indicated.

Since the cathode ray tube of a typical television receiver, such as a so-called home-entertainment television receiver, is capable of being controlled to display either video pictures of a scene, animation, or the like (referred to herein as entertainment pictures) or alphanumeric data information, such as letters, numerals, symbols, or the like (referred to as data information), it has been proposed that alphanumeric data signals be multiplexed with conventional video signals such that a broadcasting channel may transmit both video picture information and alphanumeric data information. Such alphanumeric data information may be associated with various data programs, such as a weather forecast, stock quotations, road condition information, consumer price information, and the like. This information may be displayed as words, numerals, symbols, or the like on the display screen of a television cathode ray tube.

The alphanumeric data information that is to be multiplexed with the composite video signals may be superimposed onto at least one horizontal line interval in each video frame and, more particularly, onto a horizontal line interval in each field interval. For example, horizontal line intervals #20 and #283 (referred to as line intervals 20H and 283H) of each frame normally do not contain useful video information. Hence, the alphanumeric data information may be inserted into line intervals 20H and 283H without loss of video picture information. In the aforementioned proposal, two hundred of these line intervals are used to transmit all of the alphanumeric information contained in a particular alphanumeric data program. Since only one line interval in each field is provided with such alphanumeric data signals, the complete transmission of an entire alphanumeric data program requires the transmission of two hundred fields. Then, after one alphanumeric data program is transmitted, another alphanumeric data program is transmitted in the next-following two hundred fields.

The alphanumeric data program signals which are transmitted in the 20H and 283H line intervals of each frame, that is, the alphanumeric data program signals which are transmitted in the assigned horizontal line interval in each field, contain a multi-bit data signal as well as various other multi-bit control signals. For example, the control signals may include a 16-bit write clock synchronizing code, an 8-bit framing code, an 8-bit service identification code, and two 8-bit program identification codes. In the assigned line interval in one frame, such as the 20H line interval, the alphanumeric data signals may be a 240-bit color code; whereas in the assigned line interval in the other field, i.e. the 283H line interval, the alphanumeric data signal may be formed as a 248-bit information signal. The line interval containing the color code also contains an 8-bit line code. Thus, in the aforementioned proposal, the alphanumeric data program signals which are contained in the 20H or 283H line interval are formed as 296-bit signals, consisting of a synchronizing code, a framing code, a service identification code, a program identification code, a line code, and either a color code or alphanumeric data. These alphanumeric information signals may be suitably separated from the composite video signals, and decoded so as to display the alphanumeric information on the screen of the cathode ray tube. The type of display is determined by the aforementioned service identification code, which may designate a so-called C-representation, wherein a fixed picture of alphanumeric characters is displayed across the entire display screen; an S-representation, wherein two rows of alphanumeric characters are displayed at the lower portion of the display screen, these two rows being updated with new information periodically; or T- or X-representation, wherein the alphanumeric characters are scrawled acro-s the entire display surface of the display screen, in the horizontal or vertical directions.

In the proposed alphanumeric data program transmission/reception system, a maximum of 256 different alphanumeric data programs may be transmitted. However, since two hundred field intervals are needed to transmit one entire program, approximately 3.3 seconds are required for the transmission of each program. If a television broadcasting channel is provided with N multiplexed alphanumeric data programs, then the time required for the transmission of the complete repertoire of that television broadcasting channel is equal to $3.3 \times N$ seconds. Typically, N=10. If a user wishes to observe program #1, and if the last field containing program #10 has just been transmitted, then a delay, or waiting period of 3.3 seconds must pass before the viewer observes this selected program. However, if the viewer wishes to observe program #10, and the first field containing program #1 is being transmitted, then a waiting period of 33 seconds must pass until the selected program is observed. If only the selected program is displayed on the cathode ray tube screen, then a substantial period of time will expire (up to 33 seconds in the aforementioned example) until an alphanumeric data program is observed. This unusual delay may result in concern by the viewer that his apparatus is not operating properly.

The aforementioned difficulties are particularly pronounced if the viewer is not provided with any display representing the alphanumeric data programs which are available on the broadcasting channel then being received by the television receiver. For example, the viewer may select a particular alphanumeric data program which he wishes to observe, which selected program is not transmitted on the television broadcasting channel to which his television receiver is tuned. This fact may not be readily known to the viewer, unless a listing of the alphanumeric data programs which are multiplexed onto that broadcasting channel is displayed. If 256 such alphanumeric data programs are selectable (as mentioned above), it may become quite difficult for the viewer to (a) tune his television receiver to the proper television broadcasting channel on which the alphanumeric data program which he has selected is transmitted, and (b) await the ultimate display of that selected program. Furthermore, it is helpful if, in addition to displaying the list of alphanumeric data programs which are transmitted on the television broadcasting channel then being received, an indication is provided to apprise the viewer of the particular program which is being transmitted, so that he may determine the delay which must be encountered before his selected program is displayed.

OBJECTS OF THE INVENTION

Therefore, it is an object of the present invention to provide television receiver apparatus of the type which is capable of displaying either a video picture derived from composite video signals transmitted on a broadcasting channel, or alphanumeric data information derived from alphanumeric data signals which are multiplexed with such video signals.

Another object of this invention is to provide television receiver apparatus of the aforementioned type wherein a display of all the alphanumeric data programs which are transmitted on the broadcasting channel then being received is provided.

A further object of this invention is to provide television receiver apparatus of the aforementioned type wherein, in addition to displaying a listing of the alphanumeric data programs which are transmitted on the broadcasting channel then being received, an indication is provided to apprise the viewer of the particular one of those programs which is being transmitted.

An additional object of this invention is to provide television receiver apparatus of the aforementioned type wherein, in addition to displaying a list of the alphanumeric data programs which are transmitted on the broadcasting channel then being received, an indication is provided of the particular program which the viewer has selected.

Various other objects, advantages and features of the present invention will become readily apparent from the ensuing detailed description, and the novel features will be particularly pointed out in the appended claims.

SUMMARY OF THE INVENTION

In accordance with the present invention, television receiver apparatus is provided for receiving and selectively displaying a video picture, sometimes referred to herein as an entertainment picture, derived from composite video signals transmitted on a broadcasting channel, or alphanumeric data information, sometimes referred to herein as a data picture, derived from alphanumeric data signals which are multiplexed with the composite video signals. Each broadcasting channel is provided with a number of alphanumeric data programs transmitted thereon, with each alphanumeric data program being comprised of a number of horizontal line intervals containing alphanumeric data signals and alphanumeric data program identification codes; only one of such horizontal line intervals being transmitted during each field interval. The apparatus includes an alphanumeric data program separator for separating the alphanumeric data signals and alphanumeric data program identification codes from the received broadcasting channel. A memory stores all of the alphanumeric data program identification codes which are transmitted on the received broadcasting channel; and a write-in circuit writes each of the alphanumeric data program identification codes transmitted on the received broadcasting channel into the memory, and a read-out circuit reads out each of the stored alphanumeric data program identification codes. The read-out alphanumeric data program identification codes are displayed; and the particular one of the displayed codes is indicated to identify the particular alphanumeric data program which then is being received by the television receiver apparatus.

BRIEF DESCRIPTION OF THE DRAWINGS

The following detailed description, given by way of example, will best be understood in conjunction with the accompanying drawings in which:

FIGS. 1A and 1B represent a typical format by which alphanumeric data information is multiplexed onto a composite video signal;

FIG. 2 is a block diagram of a portion of television receiver apparatus which is capable of receiving and displaying either a video (entertainment) picture or an alphanumeric data picture;

FIG. 3 is a schematic representation of the front view of the television receiver apparatus which can be used with the present invention;

FIGS. 5A–5H; 6A–6K; 7A–7N; and 8A–8G are waveform diagrams which are useful in explaining the operation of the apparatus illustrated in FIG. 4; and FIG. 9 is a schematic representation of a portion of the alphanumeric data program display.

DETAILED DESCRIPTION

Figure 4:
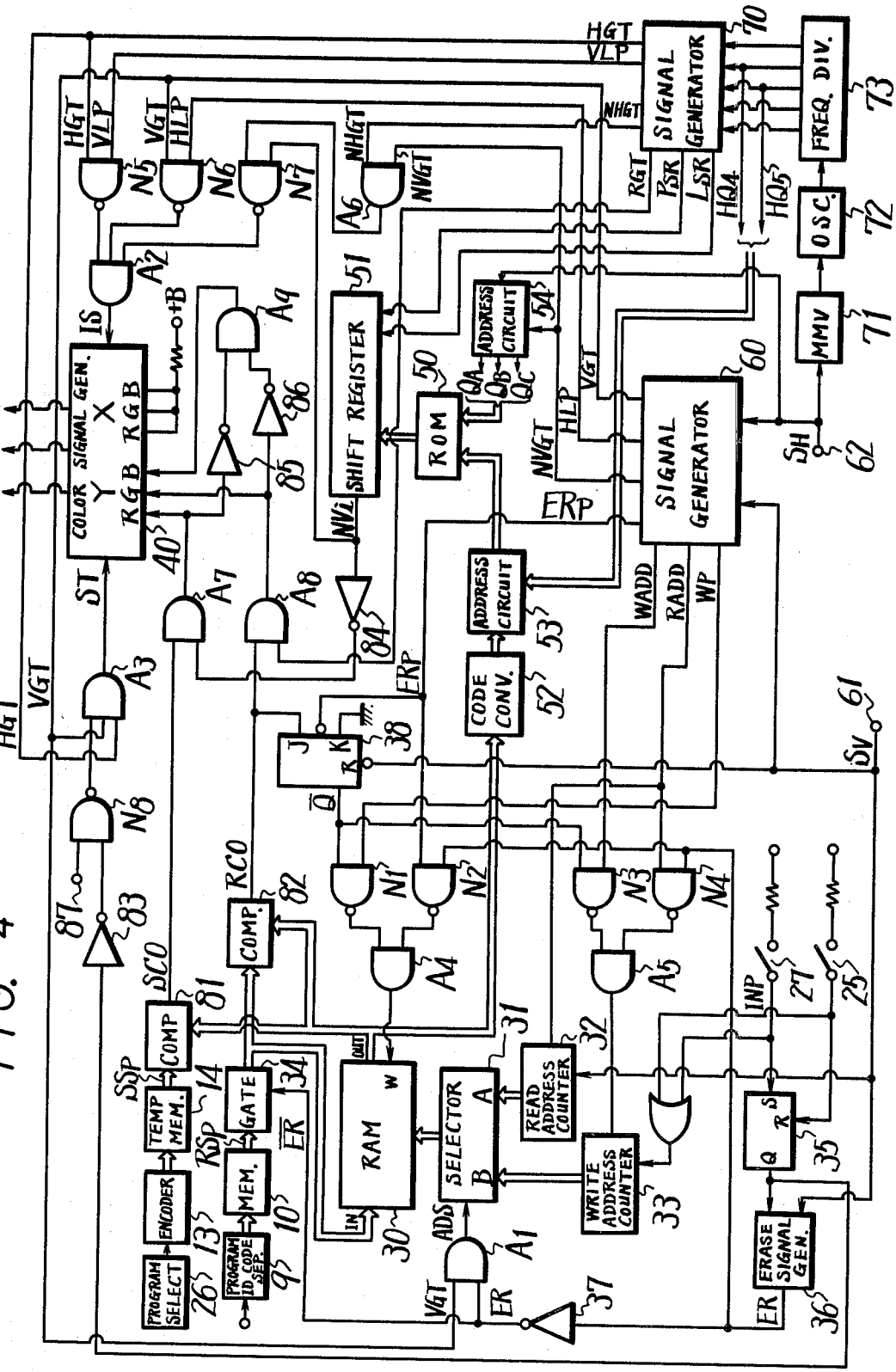
FIG. 4 is a block diagram of a portion of the television receiver apparatus by which a listing of alphanumeric data programs is displayed.

Referring now to the drawings, wherein like reference numerals are used throughout, FIGS. 1A and 1B represent the alphanumeric data information which is multiplexed with the composite video signals that are transmitted on a television broadcasting channel. As mentioned above, this alphanumeric data information is contained in one horizontal line interval during each field interval. As an example, the illustrated alphanumeric data information is provided on the 20H and 283H line intervals in respective fields. Furthermore, a complete alphanumeric data program is comprised of two hundred of these line intervals, thus extending over two hundred field intervals. FIG. 1A may represent the alphanumeric data information provided in the 20H line interval of each frame, and FIG. 1B may represent the alphanumeric data information provided in the 283H line interval in that frame. Alternatively, these particular line intervals may be reversed.

In FIGS. 1A and 1B, the horizontal line intervals are defined by horizontal synchronizing pulses $S_H$. As is conventional, a color burst signal $S_B$ follows the horizontal synchronizing pulse. Then, the alphanumeric data information $L_D$, comprised of 296 bits, is provided. These bits may be suitably encoded in conventional manner so as to be transmitted via typical television broadcasting techniques.

In FIG. 1A, the alphanumeric data information $L_D$ contains a color code $S_A$ which code, for example, is comprised of 240 bits. This color code designates the particular color by which the alphanumeric information is displayed on the display screen of the television cathode ray tube. This alphanumeric information may be in the form of letters, numerals, symbols or other alphanumeric characters. In FIG. 1B, the alphanumeric data information $L_D$ is comprised of a 248-bit digital alphanumeric data signal $S_S$. This data signal represents a portion of the actual characters that are displayed. Typically, the alphanumeric data picture may consist of a "page" of alphanumeric characters, this page being constituted by eight rows, each row containing fifteen characters. Thus, if the alphanumeric data picture is in the form of information words, these words will be displayed as eight rows, each row containing a maximum of fifteen letters.

The remainder of the alphanumeric data information $L_D$ in FIGS. 1A and 1B are similar to each other. In both the 20H and 283H line intervals, the alphanumeric data information $L_D$ includes a 16-bit write clock synchronizing code $S_C$, which is used to synchronize the display of the alphanumeric data picture. Following this synchronizing code $S_C$, the alphanumeric data signals are provided with an 8-bit framing code $S_F$ which effects frame synchronization of the alphanumeric data picture, and which also provides an indication of the starting sign of the alphanumeric information. Following the framing code $S_F$ is an 8-bit service identification code $S_{ID}$. This service identification code is used to control the particular type of display that will be provided on the cathode ray tube for the alphanumeric data information. For example, the service identification code may designate a so-called C-representation, whereby the alphanumeric data information is displayed as a fixed, or still, picture across the entire surface of the display screen. Of course, this fixed picture is formed of eight rows, each row containing up to a maximum of fifteen characters, as mentioned above. The service identification code $S_{ID}$ may designate an S-representation, wherein the alphanumeric data information is displayed in only two rows at the lower portion of the display screen. Of course, these two rows of displayed information are updated periodically. Still further, the service identification code may designate a T-representation in which one row of alphanumeric characters is scrawled horizontally (e.g. from left-to-right) across one row at the lower portion of the display screen. As yet a further designation, service identification code $S_{ID}$ may designate the X-representation in which the alphanumeric data characters are scrawled vertically (e.g. from top-to-bottom) across the entire display screen. In the C- and X-representations, the video (entertainment) picture is blanked, or replaced, in its entirety by the alphanumeric data picture. In the S- and T-representations, the alphanumeric data picture is superimposed onto the lower portion of the video (entertainment) picture.

Following the service identification code $S_{ID}$ are two 8-bit program identification codes $S_{P1}$ and $S_{P2}$. Each of these program identification codes is formed of four information bits followed by four error-correcting redundant bits. Hence, program identification codes $S_{P1}$ and $S_{P2}$ are comprised of eight information bits which serve to identify the particular alphanumeric data program that comprises the alphanumeric data information $L_D$ then being transmitted. More particularly, the digital alphanumeric data signals $S_S$ are associated with a particular alphanumeric data program which is identified by this program identification code. It is appreciated that up to a maximum of 256 different alphanumeric data programs may be identified by program identification codes $S_{P1}$ and $S_{P2}$.

FIG. 1A further represents that, in line interval 20H, for example, an 8-bit line code $S_L$ follows program identification code $S_{P2}$. This line code may be used to designate the particular display line on the cathode ray tube display screen on which the alphanumeric data information represented by alphanumeric data signals $S_S$ is displayed. For example, in a C-representation, line code $S_L$ in the first frame which contains data signals $S_S$ may designate that the alphanumeric data information represented by such data signals be displayed in line #50, the line code $S_L$ in the second frame which contains data signals $S_S$ may designate that the alphanumeric data which is represented by such data signals be displayed in line #60, and so on. It is seen that the presence of line code $S_L$ results in a color code $S_A$ formed of 240 bits, whereas the absence of this line code in FIG. 1B results in a digital alphanumeric data signal $S_S$ comprised of 248 bits.

In addition to program identification codes $S_{P1}$ and $S_{P2}$, framing code $S_F$, service identification code $S_{ID}$ and line code $S_L$ each may comprise four information bits followed by four error-correcting redundant bits. The alphanumeric data information $L_D$ extends over approximately a 52 microsecond interval within the horizontal line interval. Each of the 296 bits constituting this alphanumeric data information $L_D$ has a bit-period of approximately 0.175 microseconds. Hence, the timing, or clock frequency of the alphanumeric data information $L_D$ is selected to be equal to $8/5\ f_{sc}$ where $f_{sc}$ is the color subcarrier frequency of approximately 3.58 MHz in the NTSC system.

Referring now to FIG. 2, there is illustrated a block diagram of a portion of television receiver apparatus which is capable of receiving and displaying an alphanumeric data picture with a C-representation, wherein the data picture is a fixed picture displayed across the entire cathode ray tube display screen. The illustrated television receiver apparatus is comprised of a video detector 1, an alphanumeric data separator circuit, an alphanumeric data program selector and a TV/data change-over circuit 3. Video detector 1 may be conventional and is adapted to detect the composite video signals which are transmitted on a broadcasting channel. The detected video signals are supplied to a buffer amplifier 2, the output of which is connected to TV/data change-over circuit 3 and also to the alphanumeric data separator circuit. The detected video signal also is supplied to a synchronizing signal separator 5 which is conventional and which is adapted to separate the horizontal synchronizing signals $S_H$ and the vertical synchronizing signals $S_V$ from the detected video signals. These separated horizontal and vertical synchronizing signals are supplied to a counter 6 which is adapted to count the horizontal synchronizing signals, referenced from the vertical synchronizing signals, to produce a gating signal when the 20H and 238H line intervals are received. This gating signal is supplied to a separator circuit 4 included in the alphanumeric data separator circuit.

Separator circuit 4 may comprise a gating circuit responsive to the gate signals supplied thereto by counter 6 for separating the alphanumeric data information $L_D$ from the detected video signals during the 20H and 238H horizontal line intervals. The alphanumeric data separator circuit also includes a buffer memory 7, a transfer gate 8 and a main memory 15. Buffer memory 7 is adapted to receive and temporarily store the separated alphanumeric data information $L_D$, and to supply this separated alphanumeric data information to transfer gate 8. The transfer gate, when opened, or energized, transfers this alphanumeric data information $L_D$ to main memory 15, which accumulates the color code and digital alphanumeric data signals transmitted in successive fields until all two hundred fields have been received. At that time, the main memory stores a "page" of alphanumeric data information which can be displayed in C-representation on the cathode ray tube display screen.

The program selector circuit illustrated in FIG. 2 is comprised of a program identification code separator circuit 9, a temporary memory 10, a comparator 11, a program selector 12, an encoder 13 and a temporary memory 14. Program identification code separator circuit 9 may comprise a gating circuit which is opened, or energized, during that portion of the alphanumeric data information $L_D$ in which program identification codes $S_{P1}$ and $S_{P2}$ are present. The program identification code separator circuit thus includes one input coupled to the output of separator circuit 4, and another input coupled to receive a gating signal produced by a clock generator 22, to be described. The output of program identification code separator circuit 9 is coupled to temporary memory 10 wherein the separated program identification codes $S_{P1}$ and $S_{P2}$ are temporarily stored.

The output of temporary memory 10 is coupled to comparator 11 in which the stored, separated program identification codes $S_{P1}$ and $S_{P2}$, designated $RS_p$, are compared to a selected program code, the latter being designated $SS_p$. The purpose of comparator 11 is to compare the program identification code then being received on the broadcasting channel to a particular program identification code which may be selected by the viewer. When these respective codes are equal, that is, if the alphanumeric data program which then is received by the television receiver apparatus corresponds to the program which has been selected by the viewer, comparator 11 produces an output comparison signal. This output comparison signal is supplied to transfer gate 8 for energizing, or opening that gate, and also is supplied to one input of an AND gate 16A.

Program selector 12 may comprise suitable selector switches, a rotary selector switch, a keyboard array, or the like, capable of being manually operated by the viewer to produce a representation of the alphanumeric data program which the viewer wishes to observe. This representation, which may be, for example, the title of the alphanumeric program, a numerical identifying code, or the like, is supplied to an encoder 13 which is adapted to encode this representation into a form that is compatible, or in correspondence with, program identification codes $S_{P1}$ and $S_{P2}$. This encoded, selected program code is stored in temporary memory 14 and supplied as the selected program identification code $S_{Sp}$ to comparator 11.

As mentioned above, AND gate 16A includes one input coupled to the output of comparator 11 for receiving the comparison signal therefrom. The other input of this AND gate is coupled to program selector 12 and is adapted to receive a binary "1" signal therefrom whenever the viewer operates program selector 12. For the purpose of the present discussion, it will be assumed that a binary "1" is represented by a relatively higher voltage level, and a binary "0" is represented by a relatively lower voltage level. AND gate 16A is conventional and produces an output binary "1" only if a binary "1" is supplied to each of its input terminals. The output of this AND gate is connected to the reset input R of a set/reset flip-flop circuit 16. The set input S of this flip-flop circuit is coupled to a channel selector 17, the latter being adapted to produce a binary "1" whenever the viewer selects a different broadcasting channel to which the television receiver apparatus is tuned. As is conventional, flip-flop circuit 16 is set when a binary "1" is supplied to its set input S to provide a binary "1" at its Q output, and this flip-flop circuit is reset when a binary "1" is supplied to its reset input R to provide a binary "0" at its Q output.

The signal provided at the Q output of flip-flop circuit 16 is supplied as a change-over control signal to TV/data change-over circuit 13. Depending upon the state of this flip-flop circuit, the TV/data change-over circuit is adapted to transmit, or gate, to the cathode ray tube either the video (entertainment) signals produced at the output of buffer amplifier 2 or the alphanumeric data information $L_D$ stored in main memory 15. TV/data change-over circuit 3 is comprised of a gate 3A, schematically designated as an AND gate for simplicity, and a gate 3B. Gate 3A includes an input connected to the output of buffer amplifier 2, and gate 3B includes an input connected to the output of main memory 15. Each of gates 3A and 3B also includes a gating terminal coupled to the Q output of flip-flop circuit 16. When a binary "1" is provided at this Q output, gate 3A is enabled to transmit the video (entertainment) signals from buffer amplifier 2, while gate 3B is inhibited. Conversely, when a binary "0" is provided at the Q output of flip-flop circuit 16, gate 3B is enabled to transmit the alphanumeric data information from main memory 15, while gate 3A is disabled. The outputs of gates 3A and 3B are supplied through a gate 3C, schematically represented as an OR gate for simplicity, to the cathode ray tube.

Clock generator 22 is adapted to produce write/read clock pulses which are supplied to buffer memory 7 for the purpose of writing into this buffer memory the separated alphanumeric data information $L_D$ and reading out this alphanumeric data information from the buffer memory to transfer gate 8. Clock generator 22 also is adapted to produce the aforementioned gating signal which is supplied to program identification code separator circuit 9 for the purpose of separating the program identification codes $S_{P1}$ and $S_{P2}$ from the alphanumeric data information $L_D$. Clock generator 22 further is adapted to produce main memory write/read clock pulses which are supplied to main memory 15 for the purpose of writing alphanumeric data information $L_D$ into this main memory from transfer gate 8, and for reading out the alphanumeric data information that is stored in the main memory. The clock generator is suitably controlled to produce '' : aforementioned signals by a control circuit comprised of a burst gate 18, a subcarrier generator 19, a frequency multiplying circuit 20, a frequency dividing circuit 21 and a clock frame separator circuit 23. Burst gate 18 may be a conventional circuit adapted to separate burst signal $S_B$ from the received, composite video signal. As illustrated, burst gate 18 is coupled to buffer amplifier 2 to receive the detected, composite video signal therefrom. The output of burst gate 18 is coupled to subcarrier generator 19, which also may be conventional and is adapted to produce a continuous wave signal $S_S$ having a frequency equal to the color subcarrier frequency of 3.58 MHz. The continuous wave signal $S_S$ is supplied to frequency multiplier 20 which, for example, way include a phase-lock loop adapted to produce a signal that is synchronized with continuous wave signal $S_S$, but has a frequency that is a multiple of the color subcarrier frequency. More particularly, frequency multiplier 20 is adapted to produce a signal whose frequency is 8 times the color subcarrier frequency (8×3.58 MHz). This frequency-multiplied signal is supplied to frequency divider 21 which has a dividing ratio of 1/5. Hence, the output signal produced by frequency divider 21 has a frequency equal to 8/5×3.58 MHz.

Clock frame separator circuit 23 is coupled to the output of separator circuit 4 and is adapted to separate the write clock synchronizing code $S_C$ and the framing code $S_F$ from the alphanumeric data information $L_D$ which has been separated from the received composite video signals. As may be appreciated write clock synchronizing code $S_C$ may exhibit a unique bit pattern by which it is readily detected; thus facilitating detection of the framing code $S_F$ which, as shown in FIGS. 1A and 1B, follows the write clock synchronizing code. The separated write clock synchronizing code and framing code are supplied to frequency divider 21 and clock generator 22 to synchronize the write/read clock signals and gating signal which are generated by the clock generator.

The operation of the television receiver apparatus illustrated in FIG. 2 now will be described. Initially, let it be assumed that the viewer either actuates a power ON switch or selects a new television broadcasting channel to which his television receiver is to be tuned. This results in setting flip-flop circuit 16 to its set state, whereby a binary "1" is supplied from the Q output thereof to gates 3A and 3B. Gate 3A thus is enabled, while gate 3B is inhibited. Consequently, video (entertainment) signals which are received and detected by video detector 1 and amplified by buffer amplifier 2 are transmitted to the cathode ray tube via gates 3A and 3C of TV/data change-over circuit 3. If the broadcasting channel on which these video (entertainment) signals are transmitted also contains multiplexed alphanumeric data information, the alphanumeric data signals are not supplied to the cathode ray tube. Furthermore, such alphanumeric data information may be separated from the video (entertainment) signals by separator circuit 4; and the alphanumeric data program identification codes $S_{P1}$ and $S_{P2}$ may be separated from the alphanumeric data information by program identification code separator circuit 9, but such separated alphanumeric data program identification codes are not further utilized.

Now, let it be assumed that the viewer wishes to observe a particular alphanumeric data program. This alphanumeric data program may, for example, be the weather forecast, and is identified by alphanumeric data program identification code ABC. This code ABC may be a numerical code, a title, or the like. To select this program, the viewer operates program selector 12 which, in turn, applies signals to encoder 13 representing the selected program. The encoder then supplies to temporary memory 14 an encoded representation of code ABC, thus temporarily storing in the temporary memory an encoded representation of the selected program. Furthermore, when program selector 12 is operated, AND gate 16A is conditioned. This AND gate will be energized when the alphanumeric data program identification codes $S_{P1}$ and $S_{P2}$ which are received by the television receiver apparatus correspond to selected code ABC; that is, this AND gate will be energized when the received alphanumeric data program is equal to the selected program.

When the 20H and 283H line intervals in each frame of video signals are received, the alphanumeric data information $L_D$ which is present in these line intervals is separated by separator circuit 4, under the control of gating pulses that are produced by counter 6 from horizontal and vertical synchronizing signals $S_H$ and $S_V$, respectively. The write clock synchronizing code $S_C$ and the framing code $S_F$, included in the alphanumeric data information (FIGS. 1A and 1B) are separated therefrom by clock frame separating circuit 23, and are used to synchronize frequency divider 21 and clock generator 22. Accordingly, frequency divider 21 supplies a periodic signal of proper timing frequency to clock generator 22, and the latter supplies write/read clock pulses to buffer memory 7. Thus, the separated alphanumeric data information is written into buffer memory 7 in response to these write/read clock pulses. Once written into the buffer memory, the alphanumeric data information $L_D$ is read out therefrom and supplied to transfer gate 8.

The gating signals produced by clock generator 22 are synchronized with the times of occurrence of program identification codes $S_{P1}$ and $S_{P2}$. Program identification code separator circuit 9 is controlled by these gating pulses to gate, or separate, the program identification codes from the separated alphanumeric data information $L_D$. These separated program identification codes $S_{P1}$ and $S_{P2}$ are temporarily stored in temporary memory 10. The stored program code $RS_p$, which represents the alphanumeric data program then being received by the television receiver apparatus, is supplied to comparator 11, whereat it is compared with selected code ABC, the latter being supplied to this comparator by temporary memory 14.

If the received alphanumeric data program corresponds to the selected program, then the received alphanumeric data program identification code $RS_p$ will be equal to the selected code $SS_p$. That is, the received program identification codes $S_{P1}$ and $S_{P2}$ will be equal to code ABC. This correspondence is detected by comparator 11 which supplies a comparison signal to transfer gate 8 and to AND gate 16A. The transfer gate thus is enabled to transfer the alphanumeric data information $L_D$ read out from buffer memory 7 to main memory 15. When a full "page" of alphanumeric data is stored in main memory 15, that is, when two hundred line intervals of alphanumeric data information $L_D$ of the weather forecast program (that is, of program code ABC) is stored in the main memory, main memory write/read clock pulses produced by clock generator 21 are used to read out this alphanumeric data information.

It is recalled that, when the viewer operates program selector 12, AND gate 16A is conditioned to produce a binary "1". This binary "1" ultimately is produced when comparator 11 produces the aforementioned comparison circuit. Thus, when the received alphanumeric data program corresponds to the selected alphanumeric data program, AND gate 16A is energized to reset flip-flop circuit 16. As a consequence thereof, gate 3A is inhibited and gate 3B is enabled. Therefore, at the time that the alphanumeric data information $L_D$ is read out from main memory 15, enabled gate 3B transmits this alphanumeric data information through gate 3C to the cathode ray tube whose display screen displays the alphanumeric data picture.

It is appreciated that comparator 11 does not generate the aforementioned comparison circuit unless the received alphanumeric data program identification code $RS_p$ corresponds to the selected program identification code $SS_p$. Hence, transfer gate 8 is not enabled in the absence of this comparison signal. This means that alphanumeric data information $L_D$ of different alphanumeric data programs is not transferred into main memory 15 and, therefore, is not read out to the cathode ray tube. That is, alphanumeric data programs which do not correspond to the selected program are not displayed.

If the viewer selects alphanumeric data program ABC at a time immediately prior to the reception of horizontal line interval 20H of the first field containing program ABC, then main memory 15 will be supplied with the requisite two hundred line intervals of alphanumeric data information $L_D$ corresponding to this program in about 3.3 seconds. Hence, the delay in displaying the selected alphanumeric data program from the time that the viewer selects this program is at its minimum. If, however, horizontal line interval 283H of the two hundredth field interval containing program ABC had just been received, and then the viewer selects this program, it is appreciated that all of the alphanumeric data programs transmitted on this particular television broadcasting channel first must be received before main memory 15 is suitably loaded with the selected program. If the television broadcasting channel is multiplexed with ten separate alphanumeric data programs, each being transmitted over a time duration equal to 200 field intervals, then a delay of 33 seconds must pass before the selected alphanumeric data program is received and displayed. During this interim, the viewer may not be apprised of the reason for this delay. Hence, he may suspect that his apparatus is not operating properly. Furthermore, if the alphanumeric data program which has been selected by the viewer is not transmitted on the television broadcasting channel then being received by the television receiver, his selected alphanumeric data program will not be displayed unless and until the proper broadcasting channel is selected by channel selector 17. If the viewer is not apprised of the particular alphanumeric data programs which are multiplexed onto the particular television broadcasting channel which has been selected, he may not realize that he has selected a program which he cannot yet receive. With the availability of 256 separate alphanumeric data programs which may be selected, it is appreciated that an inordinate amount of time would be needed before the selected alphanumeric data program is displayed. For example, the viewer may select a first television broadcasting channel which he believes contains the alphanumeric data program that he desires. If that program is not transmitted by this particular broadcasting channel, the viewer will not be made aware of this until at least 33 seconds have passed, i.e. the time required for the complete repertoire of alphanumeric data programs to be transmitted by this channel. Then, the viewer may select the next television broadcasting channel and must again wait at least 33 seconds until he becomes aware of the fact that his desired alphanumeric data program also is not transmitted on this channel. This channel selection process continues until the correct channel is selected. This is a time-consuming task which may lead to frustration.

These difficulties are overcome in accordance with the present invention, wherein the viewer is provided with a display of all of the alphanumeric data programs which are multiplexed onto the particular television broadcasting channel to which his television receiver apparatus is tuned. This display also provides an indication of the particular alphanumeric data program which then is being received, as well as an indication of the alphanumeric data program which has been selected by the viewer. A front view of television receiver apparatus, including the display screen thereof, in which the present invention is incorporated is illustrated in FIG. 3.

This television receiver apparatus is provided with a display screen 24, a power ON/OFF switch 25, a plurality of channel selector switches $CH_1, CH_2 \ldots CH_{12}$, and an alphanumeric data program selector 26. In this illustrated embodiment, display screen 24 is adapted to display the usual video (entertainment) picture, an alphanumeric data picture (not shown) and a list T of the titles, identifying codes, or the like of all of the alphanumeric data programs which are multiplexed onto the television broadcasting channel to which the television receiver apparatus then is tuned. Power ON/OFF switch 25, as well as channel selector switches $CH_1 \ldots CH_{12}$ may be of conventional construction.

Alphanumeric data program selector 26 is provided with a keyboard 26K having, for example, numerical selector keys, and a display window 26D. Operation of these keys in sequence results in the generation of a program identification code, the latter being displayed in display window 26D. For example, if the viewer wishes to select the alphanumeric data program identified by code "126", or by a corresponding title, keyboard 26K is operated by depressing keys "1", "2", "6" in order, so as to display this code in the display window. As was described above, when this alphanumeric data program "126" is received by the television receiver apparatus, the alphanumeric data information is displayed on display screen 24.

Alphanumeric data program selector 26 also is provided with an index switch 27. Such as a push-button switch, which is operable to cause list T to be displayed on display screen 24 in the area thereon illustrated in FIG. 3. For example, a viewer, when observing a video (entertainment) picture derived from received video signals, may wish to be apprised of the particular alphanumeric data programs which are multiplexed onto the television broadcasting channel to which the television receiver apparatus is tuned. If the viewer operates index switch 27, list T is displayed. This apprises the viewer of those particular alphanumeric data programs which he may select. Of course, if the viewer wishes to observe an alphanumeric data program that is not provided on the television broadcasting channel to which the television receiver apparatus is tuned, a different channel selector switch CH may be operated to tune the television receiver apparatus to a different television broadcasting channel; and then index switch 27 can be operated to display list T apprising the operator of those alphanumeric data programs which now may be selected.

In the illustrated example, list T is provided with two vertical columns, viz., columns 28 and 29. Column 28 lists the titles, shown as numerical titles, of each of the alphanumeric data programs which are provided on the particular television broadcasting channel to which the television receiver apparatus is tuned. Column 29 is utilized to provide an indication of the particular alphanumeric data program which then is being received by the apparatus. It is assumed, in the illustrated example, that the television broadcasting channel to which the television receiver apparatus is tuned is provided with ten separate alphanumeric data programs. Each program title, or identification, is set out in a separate row, with additional rows marked as "X" to accommodate still further alphanumeric data programs which may be multiplexed onto the television broadcasting channel. Each row included within column 28 for displaying a respective alphanumeric data program title, or code, encompasses, for example, ten horizontal lines of the scanning raster.

A predetermined area 29G in column 29, adjacent the alphanumeric data program title, or code, which identifies the particular alphanumeric data program which then is being received by the television receiver apparatus, is provided with a distinctive indication. For example, this area may be provided with a distinctive color, such as a green-marked area, to apprise the viewer of the particular alphanumeric data program which then is being received. Furthermore an indication is provided of the particular alphanumeric data program title, or code, which has been selected by the operator. This latter indication may, for example, be provided as a distinctive background color of the row 28R in which the selected alphanumeric data program title, or code, is displayed. As a typical example, the alphanumeric data program which then is being received by the television receiver apparatus is indicated by a green area 29G adjacent the appropriate program title, or code, and the row in column 28 in which is displayed the particular alphanumeric data program title, or code, that has been selected by the viewer is indicated with a red background color 28R. The remaining background color of list T may be, for example, displayed in blue so as to distinguish this list clearly from the video (entertainment) picture which is displayed on display screen 24. The particular vertical and horizontal line demarcations which define columns 28 and 29, and which define the respective rows in which the alphanumeric data program titles, or codes, are displayed, as well as the alphanumeric characters, such as the illustrated numerals, may appear as white portions. Thus, the displayed lines, as well as the displayed numerals, are in white.

By displaying list T, the viewer is apprised of those alphanumeric data programs which are provided on the television broadcasting channel then being received. The viewer thus may select one of these programs to be displayed. Of course, if none of these alphanumeric data programs is acceptable, the viewer may select another television broadcasting channel, and may observe those alphanumeric data programs which are available for selection therefrom. Furthermore, indications 28R and 29G apprise the operator of the particular alphanumeric data program which he has selected, as well as the particular alphanumeric data program which then is being received by the television receiver apparatus. By comparing these indications, the viewer will be apprised of the time delay which must elapse until the selected alphanumeric data program is displayed.

In the embodiment described briefly above, list T is displayed when index switch 27 is operated. In an alternative embodiment, list T is displayed whenever the alphanumeric data program that is selected by the viewer, and represented by the title, or code, which appears in display window 26D, differs from the alphanumeric data program then being received by the television receiver.

When list T is displayed on display screen 24, the viewer is apprised of the particular alphanumeric data program which then is being received by the television receiver apparatus and, moreover, observes the stepping of indication 29G from one alphanumeric data program title, or code, to another. In accordance with the example wherein each alphanumeric data program is comprised of two hundred line intervals of alphanumeric data information $L_D$, which line intervals are transmitted over a duration equal to two hundred field intervals, indication 29G steps from one row to another in list T every 3.3 seconds. The viewer thus is able to predict the time dela that must elapse until his selected alphanumeric data program is received and displayed. Also, the viewer is made readily aware of whether the alphanumeric data program which he desires to observe can be received on the television broadcasting channel to which the television receiver apparatus then is tuned.

One embodiment of circuitry which is used with the television receiver apparatus of the type described in respect of FIG. 3, in order to display list T, is illustrated in FIG. 4. This circuitry is comprised of a memory device 30, which preferably is formed as a random access memory (RAM), a read address counter 32, a write address counter 33, a color signal generator 40, control signal generators 60 and 70, comparators 81 and 82, and additional control circuits, all of which will be described. RAM 30 is comprised of a plurality of addressable storage locations, each of which being adapted to store a respective program identification code. For the purpose of the present discussion, it will be assumed that the alphanumeric data program identification code which is stored in each addressable storage location is comprised of the information bits included in program identification codes $S_{P1}$ and $S_{P2}$. RAM 30 includes an input terminal which is coupled to temporary memory 10 (described above with respect to FIG. 2) via a gate 34. It is recalled that temporary memory 10 is adapted to receive the alphanumeric data program identification codes $S_{P1}$ and $S_{P2}$ from program identification code separator circuit 9, the latter being supplied with alphanumeric data information $L_D$ from separator circuit 4. RAM 30 also is provided with a write input adapted to receive negative-going write pulses, whereby the alphanumeric program identification code supplied to the input terminal thereof may be written into an addressed storage location. The write pulses supplied to this write input terminal are produced by an AND gate A4, to be described.

In addition to being adapted to have alphanumeric data program codes written thereinto, RAM 30 is adapted to read out such codes from an addressed storage location in the absence of write pulses. The alphanumeric data program identification codes read out from RAM 30 are supplied, in common, to comparators 81 and 82, and also to a code converter 52, described in greater detail below. Preferably, the alphanumeric data program identification codes which are written into and read out of RAM 30 are in the form of parallel-bit signals.

RAM 30 also includes an address input for receiving address codes. If RAM 30 is adapted to store, for example, sixteen separate alphanumeric data program identification codes, the RAM may be provided with sixteen separate addressable storage locations. Hence, the address code which is used to address these respective storage locations may be formed as a 4-bit address code. Read address counter 32 may comprise a conventional binary counter adapted to count read address pulses RADD supplied thereto. These read address pulses are described in greater detail below, and are produced by signal generator 60. Similarly, write address counter 33 is adapted to count write address pulses WADD, these pulses being produced by signal generator 60 and supplied to the write address counter via a NAND gate N3 and an AND gate A5. The respective address pulses which are supplied to the read and write address counters 32 and 33 serve to increment the count of such counters. A selector, or multiplexer, circuit 31 is coupled to each of read and write address counters 32 and 33 and is adapted to select the count of either of these counters for use as the address code for RAM 30. Accordingly, selector 31 includes A and B inputs, the A input being connected to receive the read address code produced by read address counter 32, and the B input being adapted to receive the write address code produced by write address counter 33. A control input terminal of selector 31 is connected to an AND gate A1, described below, for receiving an address selector signal ADS. If this address selector signal is a binary "1", selector 31 supplies the read address count applied to its A input to the address input terminal of RAM 30. Conversely, if the address selector signal is a binary "0", selector 31 supplies the write address count applied to its B input to the address input terminal of RAM 30.

Read address counter 32 further includes a reset, or clear, input terminal connected to a terminal 61 to receive the vertical synchronizing signal $S_V$ which is separated from the composite video signal by synchronizing signal separator circuit 5 (FIG. 2). This vertical synchronizing signal serves to reset the count of read address counter 32 to an initial count, such as 0000. Similarly, write address counter 33 includes a reset, or clear, input terminal connected to receive a reset pulse supplied thereto by an OR gate O1. This OR gate includes inputs which are connected to power ON/OFF switch 25 and index switch 27, respectively, these switches having been described hereinabove with respect to FIG. 3.

Power ON/OFF switch 25 further is connected to the reset input R of a flip-flop circuit 35. The set input S of this flip-flop circuit is connected to index switch 27. Switches 25 and 27, as illustrated in FIG. 4, are coupled to a source of operating potential such that, when either of these switches is closed, a binary "1" is supplied thereby to the reset or set inputs, respectively, of flip-flop circuit 35. The Q output of this flip-flop circuit is provided with a binary "0" when the flip-flop circuit exhibits its reset state, and is provided with a binary "1" when the flip-flop circuit exhibits its set state. This Q output is connected to an erase signal generator 36 and, additionally, to a logic inverter 83. The signal produced at this Q output is referred to herein as the index signal INDX. Erase signal generator 36, which may comprise a gated multivibrator, includes another input connected to terminal 61 to receive the separated vertical synchronizing signal $S_V$. Erase signal generator 36 is adapted to produce an erase signal ER when flip-flop circuit 35 exhibits its set state. This erase signal ER is changed over from a binary "0" to a binary "1" when a separated vertical synchronizing signal $S_V$ is supplied to the erase signal generator concurrently with a binary "1" from flip-flop circuit 35. Then, in response to the next-following vertical synchronizing signal $S_V$, erase signal ER returns to its binary "0" level, and remains at this level until flip-flop circuit 35 subsequently is set once again. Erase signal ER is inverted by inverter 37 to product the inverted erase signal $\overline{ER}$; and erase signal ER is further supplied to NAND gates N2 and N4. As will be explained below, when the erase signal ER exhibits its binary "1" level, the contents of RAM 30 are reset, or cleared, such that each addressable storage location therein is reset to an initial state. The inverted erase signal $\overline{ER}$ also is supplied by inverter 37 to AND gate A1 and to gate 34. It may be appreciated that gate 34 is disabled, or closed, when the inverted erase signal $\overline{ER}$ is at its binary "0" level, that is, this gate is disabled for the duration of the erase signal ER, for a reason to be explained.

Comparator 82, which is adapted to be supplied with the received alphanumeric data program identification code $RS_p$ from gate 34, and with the alphanumeric data program identification code read out from each of the addressable storage locations of RAM 30, serves to compare these identification codes supplied thereto and, in the event that the compared codes are equal, or correspond to each other, to produce a comparison signal RCO. This comparison signal is supplied to the J input of J-K flip-flop circuit 38 and, additionally, to one input of an AND gate A8. The J-K flip-flop circit is of conventional construction and includes a $\overline{Q}$ output coupled to respective inputs of each of NAND gates N1 and N3. The binary signal level provided at this $\overline{Q}$ output serves to selectively condition or disable these NAND gates. It is recalled that the other input of NAND gate N3 is supplied with write address pulses WADD from signal generator 60; and J-K flip-flop circuit 38 selectively conditions this NAND gate to transmit such write address pulses in order to increment the count of write address counter 33. NAND gate N1 includes another input connected to signal generator 60 to receive write pulses WP, and the output of this NAND gate is coupled to the write input terminal of RAM 30 via AND gate A4. As will be explained, NAND gate N1 is selectively conditioned by J-K flip-flop circuit 38 to transmit these write pulses WP so as to enable RAM 30 to write a received alphanumeric data program identification code into an addressed storage location therein. The J-K flip-flop circuit also includes a K input connected to reference potential, such as ground, so as to be supplied with a fixed binary "0". In addition, a so-called forced reset input R of J-K flip-flop circuit 38 is connected to terminal 61 to receive each separated vertical synchronizing pulse $S_V$. Finally, the J-K flip-flop circuit includes a clock input terminal connected to receive erase pulses $ER_p$ produced by signal generator 60. It will be appreciated that the J-K flip-flop circuit is reset to its reset state in response to each separated vertical synchronizing pulse $S_V$, thereby providing a binary "1" at the $\overline{Q}$ output thereof; and is set to its set state in response to the comparison signal RCO, the setting of this flip-flop circuit being synchronized with erase pulses $ER_p$.

Signal generator 60 may comprise digital gating and counting circuits which are supplied with the separated vertical synchronizing signal $S_V$ and horizontal synchronizing signal $S_H$. These synchronizing signals are supplied by synchronizing signal separator circuit 5 (FIG. 2) to terminals 61 and 62; these terminals being coupled to signal generator 60. The purpose of this signal generator is to produce the aforementioned read address pulses RADD, write address pulses WADD, write pulses WP, erase pulses $ER_p$, and additional gating pulses and signals which are used to control the display of list T (FIG. 3). These additional gating pulses and signals include vertical display gate signal VGT, horizontal line pattern pulse HLP and numerical pattern vertical gate pulse NVGT. The waveforms and timing relationships of the various pulses and signals produced by signal generator 60 are illustrated in FIGS. 5A–5H and 6A–6K. The manner in which such pulses and signals are produced, and the particular gating and counting circuits which are used to produce such pulses and signals, will become apparent from these waveform diagrams. Furthermore, the use of such pulses and signals to control the display of list T will be described below. Vertical display gate signal VGT is adapted to define the vertical dimension and vertical position of list T, and is supplied to AND gate A1, and AND gate A3 and a NAND gate N6. Horizontal line pattern pulses HLP are adapted to define the row-separating lines of list T, and are supplied to the other input of NAND gate N6. Numerical pattern vertical gate pulses NVGT are adapted to define the respective rows of list T in which the alphanumeric data program titles, or codes, are displayed.

Signal generator 70 is adapted to receive a plurality (for example, five) of frequency-divided pulse signals to produce various additional gating pulses and signals for the purpose of controlling the display of list T. the frequency-divided signals which are supplied to signal generator 70 are produced by monostable multivibrator 71, oscillator 72 and frequency divider 73. Monostable multivibrator 71 may be a conventional one-shot device having an input coupled to terminal 62 to receive the separated horizontal synchronizing signal $S_H$. The output of this monostable multivibrator is coupled to oscillator 72 and is adapted to trigger the oscillator which then produces a relatively high frequency oscillating pulse $P_o$. The frequency of oscillating pulse $P_o$ is substantially greater than the horizontal synchronizing frequency, and a multiple of such oscillating pulses $P_o$ are produced during a horizontal line interval. These oscillating pulses $P_o$ are supplied to frequency divider 73 which, in turn, produces successive frequency-divided pulses $HQ_1$, $HQ_2$, $HQ_3$, $HQ_4$ and $HQ_5$. In the example described herein, frequency divider 73 may comprise a conventional binary counter, or divider, such that the frequency of pulses $HQ_1$ is one-half the frequency of oscillating pulses $P_o$, the frequency of pulses $HQ_2$ is one-half the frequency of pulses $HQ_1$ and so on. These frequency-divided pulses $HQ_1$–$HQ_5$ are supplied to signal generator 70.

Signal generator 70 is adapted to count and gate the frequency-divided pulses $HQ_1$–$HQ_5$ supplied thereto so as to produce a horizontal display gate signal HGT which is adapted to define a predetermined length in each horizontal scanning line, thereby establishing the horizontal dimension and position of list T. This signal generator also functions to produce vertical line pattern pulses VLP which serve to establish the three vertical lines of list T. It is appreciated that these vertical lines define columns 28 and 29. Furthermore, signal generator 70 functions to produce receive display gate signal RGT which establishes the interval constituting column 29 of list T. Also, the signal generator is adapted to produce numerical pattern horizontal gate pulses NHGT which define the horizontal interval, or length, of column 28. The signal generator also is responsive to the frequency-divided pulses supplied thereto to produce load pulses $L_{SR}$ and clock pulses $P_{SR}$ which are used to load data elements into a shift register 51 and to shift such data elements therethrough, as will be described below.

The various signals which are used to control signal generator 70 are illustrated in FIGS. 7A–7H, and the gating pulses and signals produced by this signal generator are illustrated in FIGS. 7I and 7N. The particular gating and counting circuits, as well as the manner in which such circuits operate to produce these gating pulses and signals, will be apparent from observing the gating pulse and signal waveforms. Horizontal display gate signal HGT is supplied to an input of AND gate A3 and to one input of NAND gate N5. The other input of this NAND gate is supplied with the vertical line pattern pulse VLP. Receive display gate signal RGT is supplied from signal generator 70 to one input of AND gate A8, the other input of which is connected to receive the comparison signal RCO produced by comparator 82. Numerical pattern horizontal gate pulse NHGT is supplied to one input of AND gate A6, the other input of which is connected to signal generator 60 to receive the numerical pattern vertical gate pulse NVGT. The output of this AND gate serves to condition NAND gate N7 to transmit inverted data elements $NV_i$ to an AND gate A2, these data elements being shifted serially out of shift register 51. It will be explained below that such data elements are binary signals which represent the pattern (for example, a 5×7 array) of the alphanumeric data characters that are displayed in list T as the alphanumeric data program titles, or codes. These data elements, or alphanumeric patterns, are loaded into shift register 51 in response to load pulses $L_{SR}$; and such data elements are shifted through the shift register to NAND gate N7 in response to clock pulses $P_{SR}$.

The data elements supplied to shift register 51 are stored in a read only memory (ROM) 50. As an example, let it be assumed that the alphanumeric data program identification titles are displayed as the numerals shown in FIG. 3. ROM 50 may be thought of as comprising a plurality of addressable sections, each such section being associated with a respective numeral 0–9, and each section having addressable locations in which data elements constituting one line on that numeral are stored. If each numeral is thought of as being represented by a 5×7 dot matrix formed of five columns and seven rows, then each of these seven rows is displayed on the cathode ray tube display screen in a respective horizontal line. Essentially, each addressable section of ROM 50 includes at least seven addressable storage locations, each such storage location storing an equivalent binary representation of a corresponding row of the 5×7 dot matrix for that numeral. Thus, the section in ROM 50 associated with the numeral "4" is provided with at least seven addressable locations, each location storing at least five bits to represent the 5×7 pattern of this numeral. Addressable location #1 of section "4" thus may store the binary pattern 00010, location #2 may store the binary pattern 00110, location #3 may store the binary pattern 01010, location #4 may store the binary pattern 10010, location #5 may store the binary pattern 11111, location #6 may store the binary pattern 00010, and location #7 may store the binary pattern 00010. If each binary "1" represents a "dot", then it is seen that the addressable locations in section "4" of ROM 50 store the binary equivalent of a 5×7 dot matrix representation of 4. In a practical embodiment, each section of the ROM may be provided with ten addressable locations (rather than merely seven) so as to provide suitable spacing between the displayed rows; and each addressable location may be provided with eight bits (rather than five bits), to provide suitable spacing between adjacent numerals.

ROM 50 is addressed by address circuits 53 and 54. Address circuit 53 includes one input connected to a code converter 52, the latter being supplied with each alphanumeric data program identification code read out from RAM 30. If the alphanumeric data program identification codes stored in RAM 30 are in binary form, code converter 52 converts these binary codes to BCD codes. Code converter 52 may be omitted if the alphanumeric program identification codes are stored in RAM 30 in BCD form.

The BCD code, representing the read out alphanumeric program identification code, supplied to address circuit 53 by code converter 52 represents, for example, a three-digit number. Address circuit 53 includes another input coupled to frequency divider 73 to receive frequency-divided pulses $HQ_4$ and $HQ_5$, these pulses serving to select each digit of the three-digit numeral in sequence. Thus, address circuit 53 supplies each BCD numeral of the three-digit code received from code converter 52 to ROM 50, successively by digit, to address the corresponding sections of the ROM. Address circuit 54 is coupled to signal generator 60 to receive the numerical pattern vertical gate pulse NVGT, and also is coupled to terminal 62 to receive the separated horizontal synchronizing signal $S_H$. Address circuit 54 functions to produce frequency-divided pulses in response to the separated horizontal synchronizing signal, during each numerical pattern vertical gate pulse interval. These frequency-divided pulses are supplied as address pulses $Q_A$, $Q_B$ and $Q_C$ to ROM 50. It is appreciated that these three pulses may define eight separate addresses; and these pulses thus serve to address the respective storage locations in each addressed section of the ROM. As successive locations in successive sections of ROM 50 are addressed by address circuits 53 and 54, the data elements stored in each addressed location are read out therefrom and loaded into shift register 51. Thus, the numerical display pattern represented by such data elements is serially shifted through the shift register.

Color signal generator 40 is adapted to produce red, green and blue color signals $V_R$, $V_G$ and $V_B$, respectively. These color signals are supplied to appropriate circuits of the cathode ray tube to control the color of the picture which is displayed on the display screen thereof. If only one of these color signals is produced by color signal generator 40, the corresponding color is displayed. However, if all three color signals are produced having predetermined amplitudes, then a white picture is displayed.

Color signal generator 40 may comprise a multiplexing circuit having X and Y inputs. The X inputs are provided with terminals R, G and B, all connected in common to a source of operating potential +B. The Y inputs also include R, G and B inputs, these inputs being connected to the outputs of AND gates A7, A8 and A9, respectively. The color signal generator also is provided with an input selector terminal connected to receive color selector signal IS produced by AND gate A2. If this color selector signal IS is a binary "1", then the Y inputs of color signal generator 40 are selected, resulting in a respective red, green or blue color signal depending upon which of the R, G and B inputs is supplied with a binary "1". Conversely, if the color selector signal IS is a binary "0", then the X inputs are selected, whereupon red, green and blue color signals are produced to effect a white color display. AND gate A7 includes one input connected to comparator 81 and another input connected to receive inverted data elements $NV_i$ shifted out of shift register 51 and inverted by inverter 84. AND gate A8 includes one input connected to comparator 82 and another input connected to receive the received display gate signal RGT produced by signal generator 70. AND gate A9 includes inputs which are coupled to AND gates A7 and A8 via inverters 85 and 86, respectively.

Color signal generator 40 also includes a strobe input connected to receive a strobe signal ST. The color signal generator is disabled, or inhibited, when strobe signal ST is a binary "0". When so disabled, the color signal generator does not produce any color signals, and has no effect upon the video picture displayed by the cathode ray tube. However, when the strobe signal ST is a binary "1", the color signal generator is enabled and, depending upon the condition of the color selector signal IS, as well as the signals produced by AND gates A7, A8 and A9, corresponding color signals are supplied by the color signal generator to the cathode ray tube. Strobe signal ST is produced by AND gate A3 whose inputs, it is recalled, are supplied with vertical display gate signal VGT and horizontal display gate signal HGT. A third input of AND gate A3 is connected to the output of a NAND gate N8, this NAND gate being supplied with an inverted index signal INDX by inverter 83, and also with a signal supplied to terminal 87. The latter signal is a binary "0" except when the alphanumeric program identification code $RS_p$ then being received by the television receiver apparatus is equal, or corresponds, to the selected alphanumeric data program identification code $SS_p$, as may be produced by comparator 11 of FIG. 2.

Comparator 81 is supplied with the selected alphanumeric data program identification $SS_p$ which is produced by the viewer's manual operation of program selector 26 (FIG. 3), and which is stored in temporary memory 14, described above with respect to FIG. 2. Comparator 81 also is supplied with each alphanumeric data program identification code that is read out of RAM 30. In the event of correspondence, or equality, between the selected and read out codes, comparator 81 produces a binary "1" comparison signal SCO. As illustrated, this comparison signal SCO is supplied to AND gate A7.

The manner in which the circuitry illustrated in FIG. 4 operates now will be described. Signal generator 60 is supplied with the separated vertical synchronizing signal $S_V$ (FIG. 5A) and with the separated horizontal synchronizing signal $S_H$ (FIG. 6A). The vertical synchronizing signal is used by signal generator 60 as a reference from which horizontal line interval #52 (i.e. 52H) in one field and horizontal line interval #315 (i.e. line interval 315H) in the other field are detected. The signal generator then generates the vertical display gate signal (FIGS. 5B and 6B) commencing from line interval 52H (or 315H) and terminating when line interval 212H (or 475H) is detected. The vertical display gate signal VGT is at its binary "1" level for 160 horizontal line intervals.

During the vertical display gate signal duration, every tenth horizontal synchronizing signal is counted and used to generate the read address pulses RADD (FIGS. 5D and 6E). Thus, during the vertical display gate signal duration, sixteen read address pulses are produced. Each read address pulse may have a duration of approximately one horizontal line interval.

Signal generator 60 also produces erase pulses $ER_p$ (FIGS. 5C and 6D) which, as shown in FIGS. 6D and 6E, commence at the termination of each read address pulse RADD, and extend for a predetermined duration, for example, two horizontal line intervals. Each erase pulse $ER_p$ may be thought of as preceding a read address pulse RADD and, accordingly, sixteen erase pulses are generated during each vertical display gate signal duration. The signal generator also produces one write pulse WP (FIGS. 5E and 6J) during each field interval. The write pulse coincides with the erase pulse $ER_p$ (FIG. 6D) that is produced immediately following the termination of the vertical display gate signal VGT. A write address pulse WADD is produced at a predetermined time following the write pulse WP, such as shown in FIGS. 5F and 6K. For example, the write address pulse may be delayed by four horizontal line intervals from the termination of the write pulse, and may exhibit any desired duration, such as four horizontal line intervals.

Horizontal line pattern pulses HLP are produced periodically over the duration of a vertical display gate signal VGT, as shown in FIG. 6C. The pulse duration $T_{HL}$ of each horizontal line pattern pulse may be equal to one horizontal line interval. As illustrated, seventeen of these horizontal line pattern pulses HLP are generated during each vertical display gate signal interval. From FIGS. 6C and 6E, it is seen that, in this example, the horizontal line pattern pulses and the read address pulses RADD coincide, except for the first horizontal line pattern pulse HLP. These seventeen horizontal line pattern pulses are used to form the row-separating lines, as well as the top and bottom lines of list T (FIG. 3), and establish the vertical position of each such line. Finally, signal generator 60 produces the numerical pattern vertical gate pulses NVGT, shown in FIG. 6F. These numerical pattern vertical gate pulses commence at the termination of each erase pulse $ER_p$, and exhibit a duration equal to eight horizontal line intervals. These numerical pattern vertical gate pulses NVGT establish the vertical position and dimension (i.e. height) of each of the displayed numerals in list T that constitute the alphanumeric data program identification titles, or codes.

Each separated horizontal synchronizing signal $S_H$ (FIG. 7A) triggers monostable multivibrator 71 to its quasi-stable state, as illustrated in FIG. 7B. The monostable multivibrator returns to its stable state at a predetermined time location within the horizontal line interval. Oscillator 72 is triggered by the return of monostable multivibrator 71 to its stable state, resulting in the production of oscillating pulses $P_o$, as shown in FIG. 7C. These oscillating pulses are supplied to frequency divider 73 which, in turn, generates the frequency-divided pulses $HQ_1-HQ_5$, shown in FIGS. 7D-7H. Signal generator 70 is supplied with these frequency-divided pulses $HQ_1-HQ_5$ to produce the various gating pulses and signals now described.

Signal generator 70 produces horizontal display gate signals HGT (FIG. 7I) having a predetermined duration and disposed at a predetermined position during each horizontal line interval. In the illustrated embodiment, nine oscillating pulses $P_o$ are counted to initiate the horizontal display gate signal, and then this gate signal terminates after thirty-three additional pulses $P_o$ are counted. Of course, if desired, any selected number of oscillating pulses $P_o$ may be counted to produce the horizontal display gate signal. Vertical line pattern pulses VLP (FIG. 7J) are produced at predetermined locations during the horizontal display gate signal interval. Each vertical line pattern pulse has a duration $T_{VL}$. As one example, the first vertical line pattern pulse is produced at the commencement of the horizontal display gate signal, the next vertical line pattern pulse is produced at the eighth oscillating pulse $P_o$ following the commencement of the horizontal display gate signal, and the last vertical line pattern pulse is produced at the thirty-second oscillating pulse following the commencement of the horizontal display gate signal. Receive display gate signal RGT is triggered to commence with the first vertical line pattern pulse and to terminate with the next-following vertical line pattern pulse, as shown in FIG. 7K. Numerical pattern horizontal gate pulse NHGT (FIG. 7L) commences with the termination of the receive display gate signal RGT and terminates at the last vertical line pattern pulse VLP. As mentioned above, receive display gate signal RGT is used to define column 29 of displayed list T; and numerical pattern horizontal gate pulse NHGT is used to establish column 28 of this list.

Signal generator 70 also produces load pulses $L_{SR}$ (FIG. 7M) which, for example, may be triggered at the commencement of every fourth frequency-divided pulse $HQ_1$ (FIG. 7D). Clock pulses $P_{SR}$ (FIG. 7N) commence at the second load pulse $L_{SR}$, and terminate at the fifth load pulse. These clock pulses may have a frequency equal to, or synchronized with, the frequency of oscillating pulses $P_o$; and in one embodiment, clock pulses $P_{SR}$ are inverted versions of these oscillating pulses. In the illustrated example, and as shown in FIG. 7M, eight clock pulses $P_{SR}$ are produced in the interval defined by successive load pulses $L_{SR}$.

When power ON/OFF switch 25 is operated, flip-flop circuit 35 is reset such that the index signal INDX produced thereby is a binary "0". The closing of this power switch energizes the television receiver apparatus so as to receive and display the video (entertainment) picture derived from incoming composite video signals. Furthermore, the closing of this power switch supplies a clear signal through OR gate 01 to clear the count then present in write address counter 33. When each separated vertical synchronizing signal $S_V$ is applied to terminal 61, the count then present in read address counter 32 is cleared.

If index switch 27 is not closed, flip-flop circuit 35 remains in its reset condition, thereby inhibiting erase signal generator 36. As a consequence thereof, the erase signal ER produced thereby is a binary "0" which inhibits NAND gates N2 and N4.

Now, let it be assumed that the viewer wishes to observe the various alphanumeric data programs which are being transmitted on a television broadcasting channel to which his television receiver apparatus now is tuned. To achieve this, index switch 27 is closed so as to set flip-flop circuit 35. The closing of index switch 27 produces the index pulse INP, shown in FIG. 8A. The setting of flip-flop circuit 35 in response thereto, results in producing index signal INDX at its binary "1" level as shown in FIG. 8B. Inverter 83 inverts this index signal INDX to apply a binary "0" to NAND gate N8, whereupon this NAND gate supplies a binary "1" to AND gate A3. AND gate A3 thus is conditioned to respond to vertical and horizontal display gate signals VGT and HGT which may be produced by signal generators 60 and 70, respectively, (FIGS. 5B and 7I). The closing of index switch 27 also clears the contents of write address counter 33.

Since the index signal INDX is a binary "1", erase signal generator 36 is conditioned to respond to the next vertical synchronizing signal $S_V$, shown in FIG. 8C. In response to this vertical synchronizing signal, erase signal generator 36 produces the erase signal ER shown in FIG. 8D. That is, when flip-flop circuit 35 admits of its set state, the erase signal ER commences with the next-following vertical synchronizing signal and then terminates in response to the subsequent vertical synchronizing signal. The erase signal remains at its binary "0" level until flip-flop circuit 35 is reset and then set once again.

Erase signal ER, when at its binary "1" level, enables NAND gates N2 and N4. This erase signal is inverted by inverter 37 and supplied as a binary "0" inverted erase signal $\overline{ER}$ to AND gate A1 and to gate 34. This inhibits both gates. Consequently, alphanumeric data program identification codes which are separated from the incoming composite video signal and temporarily stored in memory 10 are not transmitted through gate 34. The output of this gate thus may be represented as zero. Furthermore, since AND gate A1 is inhibited, address select signal ADS is a binary "0"; whereby selector 31 supplies to RAM 30 the address signal represented by the count of write address counter 33. That is, the address signal supplied to the B inputs of selector 31 are utilized as the RAM address.

When the erase signal ER is a binary "1" to enable NAND gates N2 and N4, erase pulses $ER_p$, produced by signal generator 60, are transmitted, in inverted form, by NAND gate N2 to AND gate A4. From FIGS. 5C and 5E, it is seen that the write pulse WP is at its binary "0" level while these erase pulses $ER_p$ are produced. Thus, NAND gate N1 is inhibited by the binary "0" level of write pulse WP so as to supply a binary "1" to condition AND gate A4 to transmit the inverted erase pulses $ER_p$ to the write input of RAM 30. Hence, the zero output of gate 34 is written into RAM 30 in response to the first erase pulse $ER_p$ at the address determined by write address counter 33. It is recalled that the write address counter has been cleared. Hence, the address count produced thereby may be represented as 0000. Accordingly, this corresponding location in RAM 30 has the zero output of gate 34 written therein. That is, this location in the RAM is cleared.

After the first erase pulse $ER_p$ is supplied to the write input of RAm 30 as a write pulse therefor, a read address pulse RADD is produced by signal generator 60, as shown in FIG. 5D. This read address pulse is supplied, in inverted form, to AND gate A5 by NAND gate N4, which NAND gate has been conditioned by the binary "1" level of erase signal ER. From FIG. 5F, it is seen that the write address pulse WADD is at its binary "0" level when the read address pulses RADD are produced. Consequently, NAND gate N3 is inhibited by this binary "0" level of the write address pulse WADD, so as to supply an enabling binary "1" to AND gate A5. Thus, after address location 0000 in RAM 30 is cleared, the count of write address counter 33 is incremented by the first read address pulse RADD which is supplied from NAND gate N4 through AND gate A5 to the write address counter. Accordingly, storage location 0001 in RAM 30 now is addressed.

Following the incrementing of write address counter 33, as described above, the next erase pulse $ER_p$ is produced by signal generator 60 and is supplied by NAND gate N2 and AND gate A4 as a write pulse to the write output of RAM 30. The output of gate 34 remains at zero, and this "zero" code is written into storage location 0001. Then, another read address pulse RADD is produced to increment the count of write address counter 33 to the count of 0010. As a consequence thereof, the corresponding storage location in RAM 30 is addressed; and the next erase pulse $ER_p$ is supplied as a write pulse to the RAM so as to write the "zero" code into this 0010 location.

The foregoing operation is repeated, whereby all sixteen storage locations of RAM 30 have written thereinto the "zero" code produced at the output of gate 34. After the sixteenth storage location in RAM 30 is cleared in the manner described above, the write address pulse WADD is produced. At this time, flip-flop circuit 38 exhibits its reset state, whereby its $\overline{Q}$ output supplies a binary "1" to NAND gate N3. Hence, the write address pulse WADD is inverted by NAND gate N3 and supplied through AND gate A5 to increment write address counter 33 from a count of 1111 to a count of 0000. The write address counter thus is returned to its initial, reset count.

Thus, it is seen that, in the field interval immediately following the actuation of index switch 27, the contents of RAM 30 are cleared, and read address counter 32 as well as write address counter 33 are reset to their respective initial counts 0000. This field interval is referred to as erase interval $T_{ER}$.

The vertical synchronizing signal $S_V$ which terminates this erase interval $T_{ER}$ also returns the erase signal ER to its binary "0" level, as shown in FIG. 8D. Consequently, NAND gates N2 and N4, which had been used to erase the contents of RAM 30, now are disabled. Furthermore, the binary "0" level of erase signal ER is inverted by inverter 37 to supply a binary "1" inverted erase signal $\overline{ER}$ to AND gate A1 and to gate 34. This conditions AND gate A1 to transmit the vertical display gate signal VGT therethrough. Also, gate 34 now is enabled to transmit each alphanumeric data program identification code $RS_p$ that is separated from the incoming composite video signal and that is temporarily stored in memory 10.

When the vertical display gate signal VGT is produced by signal generator 60, as shown in FIGS. 5B and 8F, conditioned AND gate A1 supplies this vertical display gate signal as the address select signal ADS (FIG. 8G) to selector 31. When this address select signal ADS is at its binary "1" level, selector 31 is controlled to supply the address count applied to its A inputs to RAM 30. Thus, a read interval $T_R$ is produced for the duration of each vertical display gate signal VGT, and a write interval $T_W$ is produced between successive vertical display gate signals, as shown in FIGS. 8F and 8G.

During each read interval $T_R$, sixteen successive read address pulses RADD are supplied directly from signal generator 60 to read address counter 32. Hence, the count of read address counter 32 is incremented sequentially from its initial count 0000, 0001, 0010, ... 1111, thereby addressing successive storage locations in RAM 30. It is appreciated that, at this time, NAND gate N2 is disabled by the binary "0" level of erase signal ER. Furthermore, and as shown in FIG. 5E, the write pulse WP exhibits its binary "0" level while the read address pulses RADD are generated during the vertical display gate signal interval. Thus, NAND gate N1 also is disabled. As a consequence thereof, NAND gates N1 and N2 each supplies a binary "1" to AND gate A4 resulting in no write pulses supplied to the write input of RAM 30. In the absence of write pulses, the contents of each storage location that is addressed successively by read address counter 32 is read out of RAM 30. Each of these read out signals, which merely are "zero" codes at this time, is compared to the alphanumeric data program identification code $RS_p$ which now is being received on the television broadcasting channel. Comparator 82 compares this received alphanumeric data program identification code to the code which is read out of RAM 30. Of course, since all the contents of the RAM had been cleared, as described above, comparator 82 will not produce the binary "1" comparison signal RCO. This means that flip-flop circuit 38, which had been reset by a vertical synchronizing pulse $S_V$, is not triggered to its set state.

After all storage locations in RAM 30 have been addressed, the vertical display gate signal VGT terminates, as shown in FIGS. 5B and 8F. This changes over the address select signal ADS from its binary "1" level to its binary "0" level, as shown in FIG. 8G. Consequently, selector 31 is controlled to apply the count supplied to its B inputs by write address counter 33 to RAM 30. It is recalled that, at the present time, the count produced by write address counter 33 is its initial 0000 count. Consequently, storage location 0000 of RAM 30 is addressed. Write pulse WP, which is produced at the beginning of write interval $T_W$, as shown in FIG. 5E, is supplied by NAND gate N1 and AND gate A4 as a negative-going write pulse to the write input of RAM 30. Therefore, RAM 30 is conditioned for a write-in operation. Hence, the received alphanumeric data program identification code $RS_p$, which now is being transmitted by gate 34 to the input of RAM 30, is written into storage location 0000 now being addressed by write address counter 33. Therefore, RAM 30 stores this program identification code.

Following this write-in operation, the write address pulse WADD is produced. Since flip-flop circuit 38 remains in its reset condition, NAND gate N3 is enabled to transmit an inverted version of this write address pulse through AND gate A5 to increment the count of write address counter 33. Accordingly, the count of this counter now is changed from 0000 to a new address count of 0001.

Let it be assumed that, in the next-following field interval, the alphanumeric data information $L_D$ contains the very same program identification code. At the commencement of this new field interval, as defined by vertical synchronizing signal $S_V$, read address counter 32 is reset to its count of 0000. Now, when signal generator 60 produces the vertical display gate signal VGT, the address select signal ADS supplied to selector 31 by AND gate A1 is changed over from its binary "0" level to its binary "1" level. Accordingly, selector 31 supplies the count of read address counter 32 to RAM 30 as the address signal therefor.

During the read interval $T_R$ established by the vertical display gate signal VGT, successive read addresses pulses RADD (FIG. 5D) are supplied directly to the read address counter to increment the count thereof from the initial count of 0000 to the count of 1111. Hence, corresponding storage locations of RAM 30 are addressed successively. When storage location 0000 is addressed, the alphanumeric data program identification code which now is stored therein is read out and supplied to comparator 82. It has been assumed that, at the present time, the very same alphanumeric data program identification code is being received by the television receiver apparatus. Hence, gate 34 supplies this same code to comparator 82. Accordingly, the comparator detects equal, or corresponding, program identification codes so as to produce the comparison signal RCO. This comparison signal is supplied to the J input of flip-flop circuit 38, as shown in FIG. 5G. Therefore, upon the occurrence of the erase pulse $ER_p$ while this comparison signal is produced, flip-flop circuit 38 is set. The binary "1" provided at the $\overline{Q}$ output of flip-flop circuit 38 now is changed over to a binary "0", as shown in FIG. 5H. This binary "0" inhibits NAND gates N1 and N3. Nevertheless, the count of read address counter 32 continues to increment. However, in accordance with the example now under discussion, all of the remaining storage locations of RAM 30 have been cleared. Therefore, when the read address produced by the read address counter is incremented from its count of 0000 to a count of 0001, the contents of storage location 0001 will not be equal to, or correspond with, the received alphanumeric data program identification code $RS_p$. Hence, the comparision signal RCO produced by comparator 82 returns from its binary "1" level to its binary "0" level, as shown in FIG. 5G. Nevertheless, flip-flop circuit 38 remains in its set state to inhibit NAND gates N1 and N3.

At the completion of read interval $T_R$, vertical display gate signal VGT terminates. The address select signal ADS produced by AND gate A1 thus is changed over from its binary "0" level to its binary "1" level. Selector 31 now supplies the count of write address counter 33 to RAM 30 as the address signal therefor. It is recalled that, at the previous write interval, the count of the write address counter had been incremented from its count of 0000 to its present count of 0001. However, when the write pulse WP is produced by signal generator 60, this write pulse is blocked by disabled NAND gate N1 from being supplied to the write input of RAM 30. This means that the received alphanumeric data program identification code $RS_p$, now produced at the output of gate 34, cannot be written into RAM 30. This, of course, is desirable because the very same alphanumeric data program identification code already is stored at storage location 0000 in the RAM.

Thus, it is seen that, once a received alphanumeric data program identification code is written into one storage location in RAM 30, it is prevented from being written into any other storage location therein.

When the write address pulse WADD is produced by signal generator 60, following the write pulse WP, this write address pulse is blocked by disabled NAND gate N3 from incrementing write address counter 33. Thus, the write address counter is inhibited from having its address count changed if a received alphanumeric data program identification code had not been written into RAM 30.

The foregoing operation is repeated in subsequent field intervals. Thus, during the read interval $T_R$, the contents of RAM 30 are read out sequentially and compared to the received alphanumeric data program identification code $RS_p$ then being received by the television receiver. If any one of the read out codes is equal to, or corresponds with, the received code, comparator 82 produces the comparison signal RCO which sets flip-flop circuit 38. If this flip-flop circuit is set, RAM 30 is inhibited from performing a write-in operation; and write address counter 33 is inhibited from being incremented.

However, if a new alphanumeric data program identification code is being received by the television receiver apparatus, then none of the codes which are read out of the storage locations in RAM 30 will compare thereto. Accordingly, at the completion of the read interval $T_R$, flip-flop circuit 38 will remain in its reset state. Thus, NAND gates N1 and N3 are conditioned to transmit write pulse WP and write address pulse WADD, respectively. When write pulse WP is produced, NAND gate N1 and AND gate A4 supply a negative-going write pulse to the write input of RAM 30. Consequently, the received alphanumeric data program identification code $RS_p$ is written into the storage location of RAM 30 then being addressed by write address counter 33. Following this write-in operation, the write address pulse WADD is supplied by NAND gate N3 and AND gate A5 to increment the count of write address counter 33. Then, the foregoing operation is repeated.

It is seen that, since one complete alphanumeric data program is transmitted in two hundred field intervals, received alphanumeric data program identification codes are written into RAM 30 at the rate of one every two hundred field intervals. That is, a new identification code is written into the RAM every 3.3 seconds. If a television broadcasting channel is provided with ten different alphanumeric data programs, then all ten of the alphanumeric data program identification codes are written into RAM 30 in 29.7 seconds. Of course, when new program identification code is written into the RAM, this stored code compares to the received alphanumeric data program identification code $RS_p$ in the next-following field interval.

If the viewer selects a different television broadcasting channel to which his television receiver apparatus is tuned, it is appreciated that the alphanumeric data programs which are transmitted on that channel differ from the alphanumeric data programs which had been transmitted on the previous channel. Thus, the contents of each of the storage locations in RAM 30 will differ from each received alphanumeric data program identification code $RS_p$. Accordingly, each new received alphanumeric data program identification code will be written into a respective storage location in RAM 30 in the manner discussed above.

The contents of RAM 30 will be erased during the erase period $T_{ER}$ whenever flip-flop circuit 35 is reset (as by operating power ON/OFF switch 25), and then set once again (as by operating index switch 27).

The manner in which each program identification code read out of RAM 30 is displayed on display screen 24 (FIG. 3) now will be described. As long as flip-flop circuit 35 remains in its set state, index signal INDX remains at its binary "1" level, as shown in FIG. 8B. This index signal is inverted by inverter 83 such that NAND gate N8 supplies a binary "1" enabling signal to AND gate A3. AND gate A3 also is supplied with the vertical display gate signal VGT (FIG. 5B) and with the horizontal display gate signal HGT (FIG. 7I). Therefore, during each horizontal line interval contained within the vertical display gate interval, AND gate A3 produces a binary "1" strobe signal ST in coincidence with the horizontal display gate signal HGT. More particularly, this strobe signal is produced during each line interval from the 52H line interval to the 212H line interval, and also from the 315H line interval to the 475H line interval. This strobe signal thus is present to define the area which is occupied by list T. It is recalled that, in the presence of strobe signal ST, color signal generator 40 is enabled to produce respective color signals.

When each stored alphanumeric data program identification code is read out from RAM 30, it also is supplied to code converter 52 which, as described above, converts the read out code to a BCD code. For the purpose of the present discussion, it is assumed that the alphanumeric data program identification code represents a 3-digit number. Code converter 52 converts each of these three digits to its corresponding BCD code. The 3-digit BCD code corresponding to the read out alphanumeric data program identification code is supplied in parallel to address circuit 53.

Frequency divider 73 produces the frequency-divided pulses $HQ_1$-$HQ_5$, shown in FIGS. 7D-7H, respectively. Pulses $HQ_4$ and $HQ_5$ are supplied to address circuit 53 to identify successive ones of the 3-digit BCD code therein. More particularly, and with reference to FIGS. 7G and 7H, when pulses $HQ_4$ is a binary "0" and pulse $HQ_5$ is a binary "1", address circuit 53 transmits the most significant digit of the 3-digit BCD code supplied thereto. When pulse $HQ_4$ is a binary "1" and pulse $HQ_5$ also is a binary "1", address circuit 53 transmits the next most significant digit of the BCD code code supplied thereto. Finally, when pulse $HQ_4$ is a binary "0" and pulse $HQ_5$ also is a binary "0", address circuit 53 transmits the least significant digit of the 3-digit BCD code supplied thereto. The digits which are transmitted by the address circuit are used to address a respective section on ROM 50. For example, if the alphanumeric data program identification code then being read out of RAM 30 corresponds to the code "120", then address circuit 53, in response to pulses $HQ_4$ and $HQ_5$, transmits the BCD code representing the numeral "1", followed by the BCD code representing the numeral "2", followed by the BCD code representing the numeral "0". Thus, the section in ROM 50 corresponding to the numeral "1" first is addressed, and then the section corresponding to the numeral "2" is addressed, and then the section corresponding to the numeral "0" is addressed.

Address circuit 54 is supplied with numerical pattern vertical gate pulse NVGT (FIG. 6F), and also with the separated horizontal synchronizing signal $S_H$. Address circuit 54 may comprise a conventional binary counter adapted to count, or frequency-divide, the horizontal synchronizing signals supplied thereto during each numerical pattern vertical gate pulse interval. Thus, address circuit 54 produces frequency-divided pulses $Q_A$, $Q_B$ and $Q_C$, as shown in FIGS. 6G, 6H and 6I, respectively. These pulses are supplied to ROM 50 to address the respective locations in each addressed section. It is recalled that each section contains eight addressable locations, each location storing data elements which are representative of a particular pattern on a numeral. When pulses $Q_A$, $Q_B$ and $Q_C$ are 000, the first storage location is addressed; and when these pulses are 001, the next storage location is addressed, and so on until these pulses are 111, at which time the last storage location is addressed.

Referring to FIG. 9, it is seen that the numeral "8" is represented as a numerical pattern formed of eight rows, each row containing eight separate data elements. If address circuit 53 transmits the BCD code representing numeral "8" to ROM 50, storage location 1, shown in FIG. 9, is addressed when pulses $Q_A$, $Q_B$ and $Q_C$ are 000. The data elements stored in location 1 of section "8" in ROM 50 is seen to be equal to 00000000. When pulses $Q_A$, $Q_B$ and $Q_C$ are 001, then the second storage location in section "8" of the ROM is addressed. It is seen that the data elements stored in this second section are equal to 01110000. Thus, as pulses $Q_A$, $Q_B$ and $Q_C$ are incremented, corresponding storage locations in the addressed section of ROM 50 are read out. These data elements which are read out from ROM 50 are supplied in parallel to shift register 51.

However, all eight storage locations of an addressed section are not read out in succession. Rather, and under the control of pulses $HQ_4$ and $HQ_5$, storage location 1 of the section corresponding to the most significant digit of the read out alphanumeric data program identification code first is addressed, then storage location 1 of the section corresponding to the next most significant digit is addressed, and then storage location 1 of the section corresponding to the least significant digit is addressed. This addressing of the first storage location in the respective sections occurs during each horizontal display gate signal, as shown in FIGS. 7G–7I. Then, during the next-following horizontal line interval, pulses $Q_A$, $Q_B$ and $Q_C$ are incremented so as to address the second storage location in the section corresponding to the most significant digit, then the second storage location in the section corresponding to the next most significant digit, and then the storage location in the section corresponding to the least significant digit. The foregoing operation is repeated until all eight storage locations of all three sections corresponding to the 3-digit code are read out of ROM 50.

As shown in FIG. 7M, three load pulses $L_{SR}$ are produced during each numerical pattern horizontal gate pulse interval NHGT (FIG. 7L). Each load pulse serves to load shift register 51 with the parallel data elements which are read out of ROM 50. From FIG. 9, is is seen that these dara elements are formed as an 8-bit character. Hence, each load pulse $L_{SR}$ serves to load a parallel 8-bit character into shift register 51. After each 8-bit character is loaded therein, clock pulses $P_{SR}$ (FIG. 7N) serve to serially shift this character out of the shift register. Hence, shift register 51 serves as a parallel-to-serial converter for converting the numerical patterns read out of ROM 50 into serial display elements. The serially-shifted 8-bit characters, or numerical patterns, are inverted by inverter 84 and supplied as negative-going pulses to AND gate A7. The serially-shifted 8-bit characters also are supplied to one input of NAND gate N7.

The other input of NAND gate N7 is supplied with a signal that is a binary "1" over that portion of each row in column 28 in which the alphanumeric data program identification code is displayed (FIG. 3). Accordingly, this other input of NAND gate N7 is coupled to the output of AND gate A6 which, in turn, is supplied with numerical pattern vertical gate pulse NVGT from signal generator 60 and with numerical pattern horizontal gate pulse NHGT from signal generator 70. These gate pulses are illustrated in FIGS. 6F and 7L, respectively. Thus, whenever the numerical pattern vertical and horizontal gate pulses both are a binary "1", NAND gate N7 is enabled to supply inverted 8-bit numerical patterns to AND gate A2. Of course, whenever a negative-going pulse is supplied to AND gate A2, color select signal IS is at its binary "8" level to select the X inputs of color signal generator 40. This means that, whenever a display element is shifted out of shift register 51, the X inputs of color signal generator 40 selected so as to produce color signals $V_R$, $V_G$ and $V_B$ of such predetermined amplitudes that would result in a white display of that display element. More particularly, when each line of display elements is shifted out of shift register 51, display screen 24 displays a white dot corresponding thereto, thereby resulting in the numerical pattern display shown in FIG. 9. It is appreciated that this numerical display pattern essentially corresponds to a conventional 5×7 dot matrix.

From FIG. 6F, it is seen that successive numerical pattern vertical gate pulses NVGT are separated by a predetermined number (e.g. 4) of horizontal line intervals. This separation is effective to provide suitable vertical spacing between adjacent numerical characters which are displayed in list T. During these intervals between adjacent numerical pattern vertical gate pulses, AND gate A6 produces a binary "0", resulting in a binary "1" supplied to AND gate A2 by and gate A7.

NAND gate N6 is supplied with the vertical display gate signal VGT and also with the horizontal line pattern pulse HLP as shown in FIGS. 6B and 6C. The purpose of the horizontal line pattern pulses is to establish the seventeen white horizontal lines which act as row-separating lines in list T. It is seen, from FIGS. 6C and 6F, that each horizontal line pattern pulse HLP coincides with the binary "0" separation of adjacent numerical pattern vertical gate pulses NVGT. Accordingly, during each vertical display gate signal interval, NAND gate N6 supplies a negative-going horizontal line pattern pulse, of duration $T_{HL}$, to AND gate A2. More particularly, seventeen such negative-going horizontal line pattern pulses are supplied to this AND gate during each vertical display gate signal interval. Furthermore, this negative-going horizontal line pattern pulse changes over the color select signal IS produced by AND gate A2 to its binary "0" level. This selects the X inputs of color signal generator 40. Consequently, the color signals $V_R$, $V_G$ and $V_B$ are produced of such predetermined amplitudes as to produce a white trace during each horizontal line pattern pulse duration. Accordingly, the seventeen horizontal lines which are included in list T are displayed as white lines.

NAND gate N5 is supplied with the horizontal display gate signal HGT (FIG. 7I) and with the vertical line pattern pulse VLP (FIG. 7J) produced by signal generator 70. It is appreciated that the horizontal display gate signal HGT defines the horizontal dimension of list T. NAND gate N5 supplies a binary "0" to AND gate A2 in response to these vertical line pattern pulses VLP. Each negative-going vertical line pattern pulse supplied by the NAND gate N5 exhibits a duration $T_{VL}$. These vertical line pattern pulses establish the three vertical lines of list T. Since the color select signal IS of AND A2 is a binary "0" in response to each negative-going vertical line pattern pulse, it is appreciated that color signal generator 40 generates the color signals $V_R$, $V_G$ and $V_B$ of predetermined levels as to result in a display of white vertical lines for list T.

The binary "0" signals produced by NAND gates N5, N6 and N7 are substantially mutually exclusive. That is, when one of these NAND gates produces its binary "0", a binary "0" is not produced by either of the other two NAND gates. Furthermore, whenever NAND gate N5 produces its binary "0", a portion of one of the three vertical lines of list T is displayed. When NAND gate N6 produces its binary "0", one of the horizontal row-separating lines of list T is produced. Whenever NAND gate N7 produces its binary "0", a numerical pattern included in one of the program code digits is displayed.

Although the vertical and horizontal lines, as well as the numerical display patterns, are displayed as white marks, or elements, it is preferred that a distinctive background color also be displayed and, moreover, that separate indications be provided so as to apprise the viewer of the particular alphanumeric data program identification code that is being received, as well as the particular code which has been selected. This is achieved by AND gates A7, A8 and A9.

AND gate A7 includes one input connected to receive comparison signal SCO produced by comparator 81 when the selected alphanumeric data program identification code $SS_p$, as produced by operating keys 26K of program seletor 26 (FIG. 3) is equal to, of corresponds with, a particular alphanumeric data program identification code, that is read out of RAM 30. Of course, the particular code which is being read out of the RAM also is being displayed on display screen 24. More particularly, the code which is being read out of RAM 30 has its corresponding display elements then being shifted through shift register 51. As shown in the example of FIG. 3, if program "126" is selected, and if the corresponding program identification code is stored in RAM 30, then when this program identification code "126" is read out therefrom and shifted through shift register 51, display screen 24 will be provided with the numerical display "126" in the appropriate row of list T. At that time, comparator 81 will produce the binary "1" comparison signal SCO. This comparison signal conditions AND gate A7 to transmit the inverted 8-bit display elements shifted from shift register 51 (and inverted by inverter 84) to the red input R of the Y inputs of color signal generator 40. This means that, for the duration that code "126" is read out of RAM 30, which duration is seen to be equal to ten horizontal line intervals, as shown in FIGS. 5D and 6E, a binary "1" is supplied to the red input R of the Y inputs of color signal generator 40 by AND gate A7 except when a binary "1" data element is shifted out of the shift register. Now, it is recalled that NAND gate N7 produces a binary "1" whenever a binary "0" display element is shifted out of shift register 51. Accordingly, when a binary "1" display element, or "dot" is not shifted out of shift register 51, AND gate A2 supplies a binary "1" color select signal IS to the color signal generator. When this color select signal is at its binary "1" level, the Y inputs of the color signal generator are selected. Therefore, whenever the alphanumeric data program identification code which is read out of RAM 30 is equal to, or corresponds with, the selected code $SS_p$, color select IS is a binary "1" and AND gate A7 supplies a binary "1" to the red input R of the Y inputs of color signal genrerator 40, thereby applying the red color signal $V_R$ to the cathode ray tube. This means that, and as shown in FIG. 3, the background color for the row of list T in which the selected alphanumeric data program identification code is displayed appears as a red background. This red background is interrupted whenever a binary "1" display element or "dot" is read out of shift register 51. This is because such a "dot" inhibits AND gate A7 and, moreover, changes over the output of NAND gate N7 from a binary "1" to a binary "0", resulting in the selection of the X inputs of color signal generator 40. This selection results in a white "dot" to be displayed. Of course, the overall numerical pattern formed by these white dots superimposed onto the red background appears as the 3-digit alphanumeric data program identification code. It is seen that this red background 28R (FIG. 3), as produced in the manner described above, serves to apprise the viewer of the particular alphanumeric data program identification code which he has selected.

AND gate A8 is supplied with the receive display gate signal RGT (FIG. 7K) produced by signal generator 70. It is appreciated that the receive display gate signal duration corresponds with the horizontal dimension of column 29. Thus, when each horizontal scanning line in list T is scanned, AND gate A8 is enabled by the receive display gate signal RGT. Now, if the alphanumeric data program identification code $RS_p$ which then is being received by the television receiver apparatus is equal to, corresponds with, the alphanumeric data program identification code then being read out of RAM 30, comparator 82 supplies the binary "1" comparision signal RCO to AND gate A8. From FIG. 5D, it is seen that this comparison signal is produced over a duration equal to ten horizontal line intervals. AND gate A8 thus produces a binary "1" in response to ten successive receive display gate signals RGT. Each binary "1" produced by AND gate A8 is supplied to the G input of the Y inputs of color signal generator 40. Thus, an area of column 29 is displayed as as a green background (in response to each receive display gate signal RGT) only when the received program identification code $RS_p$ is equal to the read out program identification code. This apprises the viewer of the particular alphanumeric data program which then is being received. Of course, by being aware of the separation between the green background area 29G and the red background area 28R, the viewer is apprised of the approximate length of time which must elapse until the received alphanumeric data program corresponds to the one which he has selected.

The outputs of AND gates A7 and A8 are inverted by inverters 85 and 86, respectively, and supplied to AND gate A9. It is appreciated, therefore, that AND gate A9 produces a binary "1" when neither comparator 81 nor comparator 82 produces its comparison signal. This binary "1" is supplied to the B input of the Y inputs of color signal generator 40 resulting in the display of a blue background color for list T.

Thus, it is seen that color signal generator 40 is suitably controlled so as to provide a blue background for list T. Superimposed onto this blue background are seventeen white horizontal row-separating lines and three white vertical lines. Furthermore, the blue background is interrupted by white "dots" which are used to form the numerical patterns of the numerical program identification codes. Of course, if each program is identified by a title, letters, or symbols, a similar dot matrix display of such titles, letters or symbols will be shifted through shift register 51 and displayed on list T. Still further, comparator 81, in combination with AND gate A7, changes the blue background to a red background in column 28 (FIG. 3) for that particular row in which is displayed the program identification code of the particular program which the viewer has selected. Also, comparator 82, in cooperation with AND gate A8, changes over the blue background in column 29 to a green background in that portion of column 29 which is adjacent the displayed alphanumeric data program identification code identifying the alphanumeric data program which then is being received.

To summarize, NAND gate N5 produces a binary "1" except when the vertical line pattern pulses VLP (FIG. 7J) are produced. These vertical line pattern pulses are generated whenever an element of the three vertical lines of list T is to be displayed. At that time, the binary "0" produced by NAND gate N5 changes over the color select signal IS of AND gate A2 to cause color signal generator 40 to produce a white color signal.

NAND gate N6 produces a binary "1" except when horizontal line pattern pulses HLP (FIG. 6C) are produced. These horizontal line pulses are produced whenever a row-separating horizontal line of list T is to be displayed. At that time, NAND gate N6 supplies a binary "0" to AND gate A2, resulting in changing over the color select signal IS to a binary "0". This results in the scanning of a white horizontal line.

NAND gate N7 produces a binary "1" except when a "dot" of a numerical pattern is shifted out of shift register 51. At that time, NAND gates N7 supplies a binary "0" to AND gate A2, resulting in the production of a white color signal by color signal generator 40. Hence, each "dot" of a numerical pattern is displayed as a white dot.

AND gate A9 normally supplies a binary "1" to the B input of the Y inputs of color signal generator 40, except when either or both of comparison signals SCO and RCO are produced. Thus, a blue background of list T normally is provided, except for the aforenoted white interruptions attributed to NAND gates N5, N6 and N7. Furthermore, this blue background is changed over to a red background by AND gate A7 when that row of list T containing the selected alphanumeric data program identification code is scanned. Also, the blue background of list T is changed over to a green background at the scanning of column 29 whenever the row of list T in which is displayed the program code representing the alphanumeric data program then being received is scanned.

Furthermore, color signal generator 40 is enabled by strobe signal ST only when the vertical and horizontal display gate signals VGT and HGT coincide. That is, the color signal generator is enabled to operate only when list T is being scanned. When the color signal generator is disabled, list T is not displayed.

AND gate A3 is enabled to produce the strobe signal ST when NAND gate N8 supplies a binary "1" thereto. As mentioned above, when flip-flop circuit 35 exhibits its set state, the index signal INDX is a binary "1", which is inverted by inverter 83, resulting in a binary "1" at the output of NAND gate N8. Alternatively, terminal 87 may be supplied with the comparison signal produced by comparator 11 (FIG. 2), which is a binary "0" whenever the received program identification code $RS_p$ and the selected program identification code $SS_p$ differ. This also results in a binary "1" at the output of NAND gate N8. Hence, list T is displayed whenever the index signal is produced or, alternatively, whenever the received alphanumeric data program differs from the selected program.

Although not shown herein, suitable circuitry may be provided to blank list T, such as by disabling color signal generator 40, when the received alphanumeric data program corresponds to the selected program. At that time, the alphanumeric data program is displayed on display screen 24. As a further alternative, subsequent operation of index switch 27 may enable the color signal generator so as to display list T once again, even in the presence of the displayed alphanumeric data picture.

While the present invention has been particularly described with reference to preferred embodiments, it should be readily apparent to those of ordinary skill in the art that various changes and modifications in form and details may be made without departing from the spirit and scope of the invention. For example, rather than displaying list T on display screen 24, a separate display, formed of seven-segment elements, liquid crystals, LED's, or the like, may be provided to display the program identification titles, or codes, and also to indicate the particular program title which has been selected. Also, indications other than distinctive colors may be used to apprise the viewer of the particular program which is being received and the particular program which he has selected. Still further, various ones of the circuits which have been described above may be replaced by other conventional circuit devices which perform similar functions. For example, other suitable storage devices may be used other than RAM 30 and ROM 50. Furthermore, although shift register 51 has been shown as an example of one type of parallel-to-serial converter for producing a serialized dot matrix representation of a displayed code, or title, other circuits can be used. Thus, conventional circuitry may be provided to cause display screen 24 to display the numerical codes which are read out of RAM 30 and which constitute list T. It also should be appreciated that the various numerical examples which have been discussed hereinabove merely are illustrative. List T may display any desired number of program identification codes which are transmitted on a television broadcasting channel. The number of horizontal line intervals, for example, which constitute each code may differ from that which has been described above.

Therefore, it is intended that the appended claims be interpreted as including the foregoing as well various other such changes and modifications.

What is claimed is:

1. Television receiver apparatus for receiving and selectively displaying a video picture derived from video signals transmitted on a broadcasting channel during field and horizontal line intervals or alphanumeric data information derived from alphanumeric data signals transmitted during selected ones of said intervals, a predetermined number of alphanumeric data programs being transmitted on said broadcasting channel, each alphanumeric data program comprising a number of said intervals of alphanumeric data signals and each of said intervals containing an alphanumeric data program identification code, said apparatus comprising:

alphanumeric data program separating means for separating said alphanumeric data signals and said alphanumeric data program identification code from the received broadcasting channel;

memory means for storing all of the alphanumeric data program identification codes transmitted on said received broadcasting channel;

write means for writing each of said alphanumeric data program identification codes transmitted on said received broadcasting channel into said memory means;

read means for reading out each of the alphanumeric data program identification codes stored in said memory means;

display means for displaying the alphanumeric data program identification codes read out of said memory means; and indicating means for indicating the particular one of the displayed alphanumeric data program identification codes then being received by said television receiver apparatus.

2. The apparatus of claim 1, further comprising comparator means for comparing each alphanumeric data program identification code read out of said memory means to the alphanumeric data program identification code then being received by television receiver apparatus; and write enabling means for enabling said write means to write into said memory means said alphanumeric data program identification code then being received by said television receiver apparatus if none of the alphanumeric data program identification codes stored in said memory means is equal to said alphanumeric data program identification code then being received by said television receiver apparatus.

3. The apparatus of claim 2 wherein said memory means is an addressable memory having addressable storage locations in which respective ones of said alphanumeric data program identification codes are stored; said read means comprises read address counter means for generating successive read-out addresses representing corresponding ones of said addressable storage locations to read out the contents of the addressed storage location; and said write means comprises write address counter means for generating successive write-in addresses representing corresponding ones of said addressable storage locations into which said received alphanumeric data program identification codes are written, and write control means for incrementing the write-in address generated by said write address counter means if a preceding received alphanumeric data program identification code had been written into said addressable memory.

4. The apparatus of claim 3 wherein said alphanumeric data program identification code is transmitted during a predetermined line interval in at least one vertical field interval and wherein said television receiver receives horizontal and vertical synchronizing signals; and further comprising signal generating means responsive to said horizontal and vertical synchronizing signals for generating a predetermined number of read address pulses synchronized with said horizontal synchronizing signals during said at least one vertical field interval and generating at least one write address pulse during said at least one vertical field interval, said predetermined number of read address pulses being adapted to increment the read-out address generated by said read address counter means and said at least one write address pulse being adapted to increment the write-in address generated by said write address counter means.

5. The apparatus of claim 4 wherein said addressable memory includes a write pulse input for receiving a write pulse to enable a received alphanumeric data program identification code to be written into an addressed storage location; and wherein said signal generating means generates at least one write pulse during said at least one vertical field interval.

6. The apparatus of claim 5 wherein said write means further comprises write counter gate means responsive to said write enabling means for supplying said at least one write address pulse to said write address counter means if the alphanumeric data program identification code then being received by said television receiver apparatus is not equal to any of the alphanumeric data program identification codes stored in said addressable memory, and write enable gate means for supplying said at least one write pulse to said write pulse input of said addressable memory if said alphanumeric data program identification code then being received by said television receiver apparatus is not equal to any of the alphanumeric data program identification codes stored in said addressable memory.

7. The apparatus of claim 6 wherein said write enabling means comprises bistate means responsive to a vertical synchronizing signal to enable said counter gate means and said write enable gate means, and responsive to said comparator means to disable said counter gate means and said write enable gate means if an alphanumeric data program identification code stored in said addressable memory is equal to the alphanumeric data program identification code then being received by said television receiver apparatus.

8. The apparatus of claim 5 further comprising selector means operative to cause said addressable memory to store all of the alphanumeric data program identification codes transmitted on said received broadcast channel.

9. The apparatus of claim 8 wherein said selector means comprises a manually operative selector switch, and erase means responsive to the operation of said selector switch to erase the contents of said addressable memory.

10. The apparatus of claim 9 wherein said signal generating means further generates a predetermined number of erase pulses during a vertical field interval; and wherein said erase means comprises erase signal generating means for generating an erase signal having a duration substantially equal to a vertical field interval, erase gate means responsive to said erase signal for supplying said erase pulses to said write pulse input of said addressable memory, supply gate means responsive to said erase signal for supplying said predetermined number of read address pulses to said write address counter means to increment the write-in address generated thereby, and means responsive to said erase signal for applying a pre-set code to said addressable memory, whereby said pre-set code is written into the storage location then addressed by said write address counter means.

11. The apparatus of claim 1, further comprising program selection means for selecting a desired alphanumeric data program identification code; and wherein said indicating means further indicates the selected alphanumeric data program identification code.

12. The apparatus of claim 11 wherein said television receiver apparatus includes a cathode ray tube having a display screen; and wherein said display means comprises said cathode ray tube.

13. The apparatus of claim 12 wherein said display means comprises means for superimposing the displayed alphanumeric data program codes read out of said memory means onto a predetermined portion of said video picture.

14. The apparatus of claim 12 wherein each alphanumeric data program code is comprised of at least one alphanumeric data character, and wherein said display means comprises read only memory (ROM) means for storing predetermined data patterns representing respective alphanumeric data characters; ROM read-out means for reading out the data pattern from said ROM means corresponding to each alphanumeric data character included in the alphanumeric data program code read out of said memory means; and means for supplying the read out data patterns to said cathode ray tube.

15. The apparatus of claim 14 wherein said television receiver apparatus receives horizontal and vertical synchronizing signals; and further comprising signal generating means responsive to said horizontal and vertical synchronizing signals for generating gating signals, each defining a predetermined display area on said cathode ray tube in which said read out data patterns are displayed.

16. The apparatus of claim 15 wherein each data pattern is comprised of a predetermined number of rows of data elements; and wherein said ROM read-out means comprises an address circuit for generating successive row addresses in synchronism with said horizontal synchronizing signals to read out from said ROM means successive rows of data elements of the alphanumeric data characters then being read out of said memory means.

17. The apparatus of claim 16 wherein said means for supplying the read out data patterns to said cathode ray tube comprises shift register means; means for loading each row of data elements read out from said ROM means into said shift register means; a source of shift pulses having a frequency that is a higher order multiple of the horizontal synchronizing signal frequency; means for supplying said shift pulses to said shift register means to shift successive data elements therethrough; and gate means responsive to said gating signals to gate the shifted data elements to said cathode ray tube.

18. The apparatus of claim 17 wherein the displayed alphanumeric data characters are displayed in the form of a list having horizontal separating lines to define rows of alphanumeric data characters and having vertical lines to define the boundaries of said list; and wherein said signal generating means further generates vertical line pattern pulses at predetermined locations in selected horizontal line intervals and horizontal line pattern pulses in selected spaced apart horizontal line intervals; and means for supplying said vertical and horizontal line pattern pulses to said cathode ray tube to display said vertical lines and said horizontal separating lines, respectively.

19. The apparatus of claim 18 comprising color signal generating means coupled to said cathode ray tube for generating signals of predetermined colors; color control means for controlling said color signal generating means to produce a predetermined color signal over a selected portion of a predetermined number of horizontal line intervals in each vertical field interval; and means responsive to said vertical line pattern pulses, said horizontal line pattern pulses and said shifted data elements to replace said predetermined color signal with a distinctive color signal for displaying vertical lines, horizontal separating lines and alphanumeric data characters, respectively.

20. The apparatus of claim 1, wherein said indicating means comprises comparator means coupled to said alphanumeric data program separating means and to said memory means for comparing the alphanumeric data program identification code then being received by said television receiver apparatus with each alphanumeric data program identification code read out from said memory means and for producing a comparison signal when said respective codes are equal; and means providing a visual indication adjacent the displayed alphanumeric data program identification code in response to said comparison signal.

21. The apparatus of claim 20, wherein said television receiver apparatus receives horizontal and vertical synchronizing signals; and further comprising signal generating means responsive to said horizontal and vertical synchronizing signals for generating area defining signals to define predetermined areas on the display screen of the cathode ray tube of said television receiver apparatus, said predetermined areas including an alphanumeric data character field in which the alphanumeric data program identification codes read out from said memory means are displayed and an indicating field in which said visual indication is displayed.

22. The apparatus of claim 21, wherein said area defining signals comprise numerical pattern horizontal gate pulses at a predetermined location in at least some of the video signal horizontal line intervals, and receive display gate signals at other locations in said at least some video signal horizontal line intervals; and further comprising color signal generating means coupled to said cathode ray tube for generating signals of predetermined colors, and color control means for controlling said color signal generating means to produce a predetermined color signal in response to said receive display gate signals if said comparison signal is produced.

23. Television receiver apparatus for receiving and selectively displaying on the display screen of a cathode ray tube a video picture derived from video signals transmitted on a broadcasting channel and having field and horizontal line intervals, or alphanumeric data information derived from alphanumeric data program signals transmitted during at least one selected horizontal line interval in each field interval, said broadcasting channel transmitting a predetermined number of alphanumeric data programs, each alphanumeric data program being transmitted over a number of said field intervals with each of said selected horizontal line intervals containing an alphanumeric data program identification code formed of alphanumeric characters representing a respective alphanumeric data program, said apparatus comprising:

alphanumeric data program separating means for separating said alphanumeric data program signals and said alphanumeric program identification codes from the received broadcasting channel;

addressable memory means having a plurality of addressable storage locations for storing respective ones of said alphanumeric program identification codes;

switch means manually operable to clear the contents of said addressable memory means;

read means, including read address counter means, operative after the contents of said addressable memory means have been cleared, to address successively each of said storage locations during a predetermined interval so as to read out the contents of each addressed storage location;

comparator means coupled to said separating means and to said addressable memory means to compare each alphanumeric program identification code read out from said addressable memory means to the alphanumeric program identification code then being received by said television receiver apparatus and to produce a comparison signal if the compared codes are equal;

write means, including write address counter means, operative after the contents of all of said storage locations have been read out, to write the alphanumeric program identification code then being received by said television receiver apparatus into the storage location addressed by said write address counter means;

write address pulse generating means for supplying periodic write address pulses to said write address counter means to increment the count thereof;

inhibit means responsive to said comparison signal to inhibit said write means from writing the alphanumeric program identification code then being received by said television receiver apparatus into the storage location addressed by said write address counter means and to inhibit the count of said write address counter means from being incremented;

read only memory (ROM) means having a plurality of sections, each associated with an alphanumeric character and each section having storage locations for storing patterns of data elements representing a respective alphanumeric character;

means for addressing the sections of said ROM means with the alphanumeric characters forming the alphanumeric program identification code read out from said addressable memory means;

means for reading out the patterns of data elements from the storage locations of the addressed section of said ROM means during predetermined portions of successive ones of said horizontal line intervals;

color signal generating means for supplying a predetermined background color signal to said cathode ray tube;

enabling means for enabling said color signal generating means during at least said predetermined portions of a preselected number of horizontal line areas such that an area of background color is displayed on the display screen of said cathode ray tube; and color control means for controlling said color signal generating means in accordance with said patterns of data elements read out from said ROM means to modify said background color and provide a viewable display of alphanumeric program identification codes.

24. A method of controlling a television receiver, of the type adapted to selectively display either a video entertainment picture derived from a composite video signal or an alphanumeric data picture derived from alphanumeric data signals multiplexed onto said composite video signal, to display alphanumeric program identification codes representing the alphanumeric data programs that may be observed, comprising the steps of separating the alphanumeric data signals, including program identification codes, from said composite video signal; writing each separated program identification code into a respective location of a memory; reading out the contents of all of said respective locations of said memory during predetermined, repetitive intervals; displaying the contents read out of said memory on the cathode ray tube of said television receiver in the form of a list positioned at a predetermined location on the display screen of said cathode ray tube; and indicating which of the displayed program identification codes represents the alphanumeric data program then being received by said television receiver.

* * * * *